United States Patent [19]
Decker

[11] Patent Number: 5,107,441
[45] Date of Patent: Apr. 21, 1992

[54] SYSTEM FOR EVALUATING THE FLOW PERFORMANCE CHARACTERISTICS OF A DEVICE

[75] Inventor: Kenneth L. Decker, Garland, Tex.

[73] Assignee: Otis Engineering Corporation, Dallas, Tex.

[21] Appl. No.: 606,872

[22] Filed: Oct. 31, 1990

[51] Int. Cl.$^5$ ............................................. G01F 25/00
[52] U.S. Cl. .................................... 364/510; 137/155; 73/3; 73/155; 73/168
[58] Field of Search ........... 364/510, 509, 422, 551.01, 364/558, 578; 137/155; 73/3, 151, 155, 861.52, 861.53, 861.62, 861, 168

[56] References Cited

U.S. PATENT DOCUMENTS

| | | | |
|---|---|---|---|
| 1,924,125 | 8/1933 | Linderman, Jr. | 73/861.62 |
| 1,946,319 | 2/1934 | Hodgson et al. | 73/861.62 |
| 4,406,161 | 9/1983 | Locke et al. | 73/861.52 X |
| 4,442,710 | 4/1984 | Meng | 73/151 |
| 4,566,310 | 1/1986 | Cohen et al. | 73/168 X |
| 4,581,707 | 4/1986 | Millar | 364/509 |
| 4,766,759 | 8/1988 | Cohrs et al. | 73/3 |

OTHER PUBLICATIONS

Offshore Technology Conference, Author K. L. Decker, Computer Modeling of Gas–Lift Valve Performance, 1986 [18th Annual OTC, May 5–8, 1986].

Society of Petroleum Engineers, Author Nieberding, et al., Normalization of Nitrogen–Loaded Gas–Lift Valve Performance Data, 1990 [65th Annual Technical Conference and Exhibition, New Orleans La., Sep. 23–26, 1990].

*Primary Examiner*—Parshotam S. Lall
*Assistant Examiner*—S. A. Melnick
*Attorney, Agent, or Firm*—Johnson & Gibbs

[57] ABSTRACT

A system for determining the flow performance of a valve by first measuring certain flow parameters of the valve with the stem fixed in a plurality of different positions between full open and full closed and then calculating a value of flow coefficient for each. The flow parameters of the valve are then measured with the stem dynamically moving under a plurality of different flow conditions. Mathematical relationships are derived in accordance with certain procedures for calculating the flow rate of the valve under each of the different flow conditions.

34 Claims, 5 Drawing Sheets

SYSTEM FOR EVALUATING THE FLOW PERFORMANCE CHARACTERISTICS OF A DEVICE

BACKGROUND OF THE INVENTION

1. Field of the Invention

The invention relates to a system for determining the flow performance characteristics of a flow control device and, more particularly, to determining the flow performance characteristics of a gas lift valve.

2. History of the Prior Art

Every device which is used as a flow restrictor or flow controller acccomplishes its purpose by putting some type of restriction into the flow path of the fluid being controlled. In such devices, there are basically three parameters which affect the characteristics of the flow through the device. These are the upstream pressure, the downstream pressure, and the degree of flow restriction through the device. The flow coefficient, $C_v$, of a device is a measurement of its ability to restrict fluid flow through it. This value is independent of both absolute pressure of the device and the differential pressure across it. Rather, it is a function of only the geometry of the device itself. In the case where the device is an orifice valve where the geometry does not change, this factor is referred to as the discharge coefficient of the valve. In the case of a valve where the geometry does change depending on the position of the valve stem with respect to the seat, this value is called the flow coefficient of the valve. The flow coefficient of a valve changes as a function of the position of the valve stem with respect to the seat of the valve. When the valve is completely closed the flow coefficient is 0 and when the valve is full open its flow coefficient may be equal to 1. In between these two extremes, the flow coefficient of the valve may or may not vary linearly with the position of the valve stem and can have any particular shape. Ascertaining the shape of a valve's flow coefficient curve as a function of all the various parameters which can effect it in an operating flow environment, is difficult. Nevertheless, the flow characteristics of a valve are very important in predicting the performance of the valve in operation.

One particular environment in which the operating characteristics of a flow control device are highly critical to the successful operation of the device is in the case of gas lift valves used in a gas lift petroleum production well completion.

In a petroleum production well in which the native reservoir energy of the formations producing into the well are sufficiently low that there is not enough pressure within the formation to force fluids in the well to the surface, gases from an external source are often injected into the well casing and from there into the well tubing at various points spaced downwardly along the tubing to force the production fluids to the surface. In other wells in which there is sufficient reservoir pressure to force fluids to the surface, injection gases may often be used to increase the production from the well. This technique of producing fluids in a well is known as a gas lift well completion. The height of fluid within the well tubing which can be forced to the surface in a gas lift completion is a function of the amount of pressure available in the casing and the density of the fluids in the tubing. For this reason, gas lift injection valves are placed in the well tubing string at spaced intervals down the tubing to control the injection of gas from the casing into the tubing as a function of: (a) the pressure in the casing (b) the pressure in the tubing; and (c) the set pressure of the gas lift valve itself. Each valve generally includes a "set pressure" which is established by a chamber within the valve which is filled with compressed nitrogen to a preselected pressure value and which acts to exert a force tending to close the valve or by a compressed spring which controls the force of engagement of the stem of the valve with the seat also tending to close the valve. The pressure within the well tubing and the annulus applies a force opposite to that of the set pressure of the valve tending to open the valve. While there are various types of gas lift valves, e.g., production pressure operated valves and injection pressure operated valves, only the production pressure operated gas lift valves will be discussed hereinafter for purposes of illustration. When the pressure within the tubing reaches a preselected value, established in accordance with the set pressure of a production pressure operated gas lift valve, the valve will open to inject pressurized gas from within the well casing into the tubing so as to lift the fluids which have collected in the tubing above that valve toward the surface and discharge them out into a collection reservoir. Once the fluids above each gas lift valve have been aerated to decrease their fluid density, the next lower gas lift valve is operated to aerate the fluids above it and so forth down to the so-called "operating" valve of the well completion which is located in the region of the geological formation being produced. The operating valve operates to inject gas from the casing into the tubing to aerate fluids within the region of the production formation of the well and allow the free flow of fluids from the formation into the well.

The process of systematically aerating well fluids within the upper regions of the tubing down to the operating region of the tubing is called "lifting" the well, and removal of fluid in the annulus down to the operating region is referred to as "unloading" the well. When fluids accumulate within the tubing above the operating region it is necessary to periodically lift the well in order to have it operate in the most efficient manner Gas lift valves are the key components of a gas lift well completion.

As mentioned above, gas lift valves include either an internal nitrogen charged chamber aloting on a piston area or a compressed spring which holds the stem of the valve against the valve seat in order to keep it closed. In a tubing pressure operated gas lift valve, the pressure within the well tubing acts upon the piston area of the valve against the force of the spring. When the tubing pressure becomes sufficiently great (due to the accumulation of a column of fluid in the tubing) it will cause the valve stem to move upwardly opening the valve port and allowing gas to enter from the casing of the well into the tubing. In the conventional design of gas lift completions, it is generally assumed that a gas lift valve operates like a switch and goes from full closed to full open with no resistance to the flow through the valve. In fact, gas lift valves do not work this way. Instead, the valve stem moves from a closed position to an open position gradually and sometimes it takes a significant increase in the casing pressure in order to get the valve to move to the full open position. Thus, because of the gradual movement of the valve from a full closed position to a full open position, the amount of gas that is passed from the casing into the tubing through that valve varies depending upon the casing pressure, the tubing pressure, and the set pressure of the valve. The ability to accurately predict the rate of gas flow through gas lift valves has proven to be a very difficult task.

The use of gas lift valves in a gas lift well completion allows one to use relatively low injection pressures at the surface in order to overcome very high tubing pressures at great depths within the well, e.g., 9-10,000 feet. This is because the use of multiple gas lift valves spaced down the well allows it to unload fluids from the well in stages. The first valve unloads only the upper portion of the column of fluid in the annulus down to that first valve and the second valve unloads the fluids from the first valve to the second valve and so forth. This allows the use of a much lower casing pressure to unload the well because aeration of the fluids in the tubing above each valve reduces the tubing pressure at all the lower valves and allows those valves to be operated by a lower casing pressure.

In designing the placement of gas lift valves within a system and selecting the set pressures of individual gas injection valves in that system it is important to know how much gas will flow through the upper valve during the unloading process so that the tubing fluid gradient is lightened sufficiently to get down to the next lower valve. If the system designer does not know how much gas is actually flowed through the upper valve then either one of two inaccuracies is likely to occur. First, if the valve is flowing a great deal more gas than is anticipated, pressure of the injection gas in the annulus is pasted through the valve and is not available to continue unloading fluids from the annulus. Secondly, if there is not enough gas flowing through the upper gas lift valves the system will not be able to lighten the fluid gradient in the tubing above that valve sufficiently to be able to operate the next lower valve. Thus, it is important to accurately know the amount of gas which will flow through each gas lift valve in order to allow the unloading process to step down to the next lower valve. While inaccuracy in gas flow calculations is not a serious problem in the upper valves, because there is sufficient casing pressure to unload the fluid down to those levels, the problem becomes severe in the region of the lower valves. Especially in the region adjacent the operating valves at the lower part of the well it is very important to know how much gas has gone through each of the operating gas lift valves and what are the pressure conditions that exist while such flow is occurring.

The performance of a gas lift valve is basically a function of four parameters: (a) the set pressure of the valve; (b) the casing pressure operating opposite the valve; (c) the tubing pressure operating opposite the valve; and (d) the geometry of the valve itself, i.e., the position of the valve stem with respect to the seat at the various pressures.

Prior art techniques of predicting gas lift valve flow performance characteristics have been very imprecise. As mentioned above, one approach has been to assume that the gas lift valve operates either in a full open or a full closed position. While this assumption simplifies the prediction of the flows through the valve consideration, i.e., at full close the flow is 0 and at full open its flow is a function of the orifice size, it is in general a false assumption. Nevertheless, charts have been produced that predict gas flows through an orifice size based upon solely the upstream and downstream pressures. Such charts are relatively inaccurate and contribute to substantial errors in calculations connected with the design of gas lift completion systems.

In an effort to enhance the accuracy of the prediction of gas lift valve flow characteristics, another approach has been to try and experimentally analyze each valve at specific pressures and pressure differentials. While such actual test data is very helpful in the design of such systems, since the valve is measured under precisely the conditions at which it is to be operates, the data is very unreliable except at those very pressures. Further, the testing and preparation of charts for each valve at every conceivable operating pressure condition and pressure differential is exceedingly expensive and time consuming and impractical from a standard operating standpoint.

One other approach which has been tried in connection with predicting gas lift valve flow characteristics is that of running the valve at the pressures at which it is intended to be used and then determining a typical flow performance curve for the valve at that pressure. The flow performance curve is then broken down into two different portions. One portion is referred to as orifice flow and the other portion is referred to as throttling flow. For the orifice flow portion of the performance curve the flow characteristics are assumed to be simply that of orifice size. For the throttling flow portion of the curve, the gas flow characteristics are assumed to go from a high value to a closed condition over a range of 300 to 400 PSI and that the change from zero to maximum flow is linear as a function of pressure. Since the change in flow rate in the region of throttling flow is assumed to be linear, a slope is computed and used to calculate flow rates at other pressures other than at the specific measured values. This is a good approximation if the flow through the valve is linear, however, experience has shown that in the case of most gas lift valves the flow variation is far from liner.

When a pressure sensitive valve, such as a gas lift valve, is full open it has a certain fixed geometry which determines the flow rate through the valve in response to a pressure differential across the seat of the valve. However as the stem of the valve leaves its full open configuration and moves toward the seat, the geometry of the valve changes slightly which will, of course, affect the flow characteristics through the valve. As discussed above, accurate gas lift valve flow performance data is needed in order to accurately space the valves along the tubing of a gas lift completion. Virtually all spacing techniques assume that when gas is injected at a gas lift valve, the tubing flow gradient at that valve will be reduced according to a two phase vertical flowing gradient correlation. This reduction in tubing pressure will be reflected down the hole as a reduction in tubing pressure at each of the successively lower valves. The key to successive valve spacing in such a completion is accurately predicting the tubing pressure at each and every valve along the completion.

Since injected gas lightens the flowing tubing gradient, the differential pressure across the valve increases as the tubing pressure decreases. The rate of gas injection at each valve is the result of the individual valve's flow characteristics, the valve stem position and the differential pressure across that valve. As the tubing pressure decreases the valve stem will throttle to a closed position rather than going abruptly from a full open to a full close position.

Because of errors in the assumption that a gas lift valve moves abruptly from full open to closed position, the actual flow through a gas lift valve is considerably less than that which is calculated based upon this assumption. As a result, the assumed tubing pressure at the valve is much lower than the actual tubing pressure. Thus, an error in assumed tubing pressure causes unloading to become studied at an upper valve for lack of gas required to achieve the gas liquid ratio (GLR) necessary to uncover the next lower valve and creates a highly inefficient gas lift completion.

In except prior art gas lift valve performance testing to date, there have been performed a large number of tests on live gas lift valves in a fixture simulating a tubing side pocket mandrel at the pressures normally encountered in unloading operations. A plot of these flow rates versus tubing pressure is generally made and the data from these plots are then scrutinized to produce some type of empirical equation used to predict the maximum flow and the tubing pressure at which the maximum flow occurs through the valve. The resulting empirical equation does not usually include any specific valve parameters and is an equation only of a group of performance curves. This type of testing is time consuming expensive and applicable only to the specific valve tested and only at the specific pressure tested. Use of this type of empirical equation to try and predict flow rate performance at pressures other than those actually tested produces highly inaccurate and unreliable results in the design of gas lift systems. However, despite all its shortcomings, this type of testing and attempted empirical correlation is the technique most readily acceptable because it closely approximates what design engineers believe will happen downhole.

Further alternative to live valve testing is an attempt to theoretically analyze the stem position of the gas lift valve with respect to the port and then compute the pressure distribution throughout the valve. The stem position affects flow rates and pressure distributions and, conversely, the pressure distributions on the valve surface affects the stem position. Mathematically modeling this complex interaction of parameters is very difficult and highly prone to error. It has not yet been successfully accomplished.

The system of the present invention involves flow coefficient testing of valves in accordance with standard operating and testing procedures, well accepted in the industry.

The system of the present invention is designed to predict the flow performance characteristics of valves, or other flow control devices, that have a throttling character which comes about because the valves are pressure sensitive. Such pressure sensitivity arises both as a result of the absolute pressure of the valve as well as the differential pressure across the valve controlling the performance characteristics of the valve itself.

The system of the present invention enables the prediction of the flow performance of a valve with a minimum of actual testing of the valve. It also produces a continuous performance curve of the valve which enables a very precise prediction of the flow through the valve for various pressure conditions to which the valve may be subject.

The system of the present invention is adaptable to accurately measure a few limited parameters about a valve and then from that limited data accurately predict performance of the valve under numerous different and various operating conditions. This enables the designer of a gas lift system to very accurately predict the flow characteristics through the valve at virtually any design pressure condition within an operating environment.

SUMMARY OF THE INVENTION

In one aspect of the method of the present invention a particular valve is tested at a plurality of different differential pressures across the valve and a series of input pressures to the valve. For each of these input pressures and differential pressures, the dynamic stem position of the valve stem is developed in relation to certain static variables of the valve. In one aspect, the ratio of the dynamic stem travel of the valve to the static stem travel as a function of the differential pressure across the valve divided by the casing pressure minus the closing pressure of that valve produces a correlation function for the valve.

In another aspect the present invention includes a method for determining the flow performance of a pressure respective valve in which the flow rate of the valve is measured at a plurality of different values of pressures drop across the valve and at different fixed stem positions of the valve. From the values measured the flow coefficient and terminal pressure drop ratio of the valve are determined at each stem position thereof. Mathematical relationships are empirically determined describing each of the flow coefficient and the terminal pressure drop ratio of the valve as a function of the stem position thereof. The flow rate of the valve is measured at various values of casing pressure with various values of pressure drop across the valve for each The values employed and measured previously are used to determine a value of flow coefficient at each measured data point. Each value of flow coefficient previously determined is used along with the mathematical relationship previously derived to determine a value of dynamic stem position for the valve at each measured data point. A mathematical relationship describing the dynamic stem travel of the valve as a function of the ratio of the differential pressure across the valve to the difference between the casing pressure and the valve set pressure is then empirically determining. The static stem position is determined for each value employed and measured previously from the fixed values of effective bellows area and spring rate for the valve. For each value employed and measured previously and each value of static stem position calculated previously, a dynamic stem position of the valve is determined Each dynamic stem position is used to calculate a value of flow coefficient which is, in turn, used to calculate a fluid flow rate through the valve for each corresponding differential pressure across the valve, casing pressure and valve closing pressure measured previously.

In still another aspect, the present invention includes a method for determining the flow performance of a production pressure respective valve having a selected downstream set pressure, at which the valve just opens when subjected to no upstream pressure, when the valve is subjected to a particular upstream pressure and a particular downstream pressure. The method includes determining the static stem position of the valve at the particular downstream pressure. Mathematical relationships are empirically derived describing the flow coefficient of the valve as a function of the dynamic stem position of the valve and the ratio of the dynamic stem position to the static stem position of the valve as a function of the ratio of the differential pressure across the valve to the difference between the upstream pressure on the valve and the downstream set pressure of the valve. One of these mathematical relationships is used to determine the dynamic stem position of the valve at the static stem position previously determined for the particular upstream pressure and the particular downstream pressure. The other mathematical relationship is used to determine the flow coefficient of the valve from the dynamic stem position of the valve previously determined. Finally, the flow rate through the valve is determined from the flow coefficient previously determined and the particular upstream and downstream pressures.

BRIEF DESCRIPTION OF THE DRAWINGS

For an understanding of the present invention and for further aspects and advantages thereof, reference may now be had to the following description taken in conjunction with the accompanying drawing in which.

DETAIL DESCRIPTION OF PREFERRED EMBODIMENT

Exemplary Flow Control Valve

Figure 1:
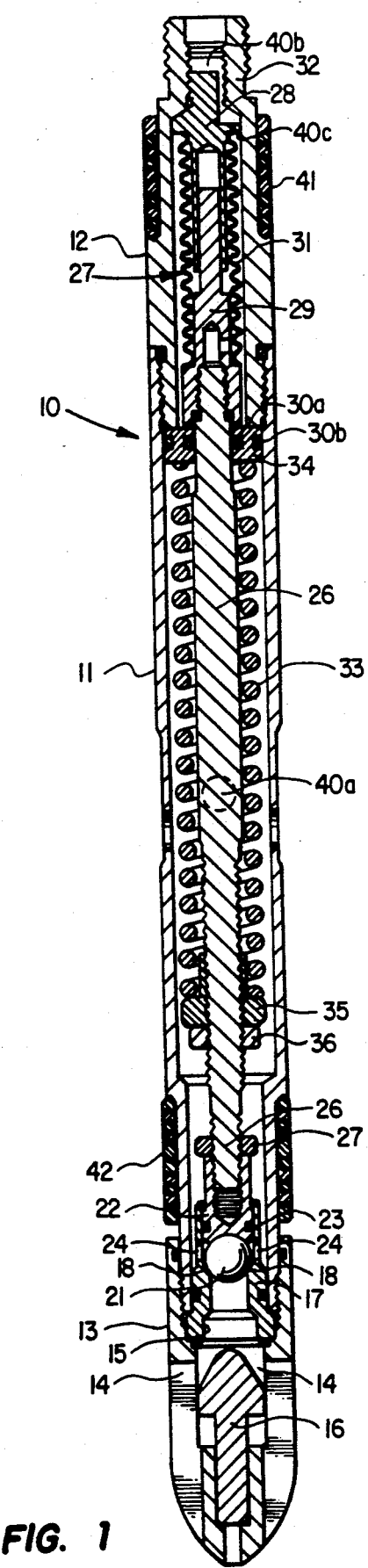
FIG. 1 is a longitudinal cross section view of an illustrative gas lift injection valve.

Referring first to FIG. 1, there is shown a longitudinal cross-sectioned view of an illustrative gas injection valve the performance characteristics of which are illustratively calculated in accordance with the present invention. It should be understood that the gas lift valve of FIG. 1 is a production pressure operated valve and is merely exemplary of various pressure sensitive flow devices, including injection pressure operated valves, the operational parameters of which can be analyzed, evaluated and determined by the method and system of the present invention. In FIG. 1, the valve 10 includes a central housing 11, an upper bellows housing 12 and a lower valve housing 13. The lower housing 13 includes a plurality of apertures 14 which lead between the outside of the valve and an opening 15 leading to the interior of the valve. A check valve 16 is moveable into and away from engagement with the opening 15 to prevent the reverse flow of fluids into the valve. The lower housing 13 is in threaded engagement with the lower end of the central housing 11. The lower end of the central housing 11 receives a cylindrical valve seat assembly 17 which is held rigidly in place by the threaded engagement of the lower housing 13 with the lower end of the central housing 11. The seat assembly 17 includes a circular valve seat 18 with which a spherical valve stem 21 may engage to close the valve. The spherical stem 21 is mounted within a lower stem assembly 22. The upper end of the seat assembly receives the lower end of the stem assembly 22 and is sealed thereto by means of an O-ring 23. The seat assembly also includes a plurality of choke apertures 24 formed at orthogonal locations with respect to one another above the seat 18 to provide a pressure drop orifice for the valve to ensure that the lower surface of the spherical stem is exposed only to the tubing pressure of the valve.

The open ended socket portion of the valve stem assembly 22 is threadedly engaged with the lower end of an elongate stem 26 and clamped thereto by means of a hexagonal lock nut 27. The stem 26 extends from the lower end of the valve !0 axially along the central housing 11 to the lower end of the bellows hosing 12. The upper end of the stem 26 is threadedly engaged with the lower end of the bellows assembly 27 which comprises an upper bellows seal 28 and a lower bellows seal 29 which are axially slidable one within the other and are joined along the exterior thereof by means of a axially collapsible cylindrical bellows member 31. The upper end of the bellows 28 is threaded to the upper end cap 32 of the bellows casing 12. The upper end of the stem 26 is passed through a seal support ring which is pressure sealed to both the stem 26 and the interior of the housing 11 by means of a pair of O-rings 30a and 30b. A helical spring 33 has its upper end abutting the seal support ring 34 and its lower end abutting a spring adjustment nut 35 the lower edge of which abuts a hexagonal stop nut 36. The nuts 35 and 36 allow adjustment of the tension of the spring 33 to vary the force with which the spring presses downwardly in the axial direction along the stem 26 and thus the sealing force exerted by the spherical valve stem 21 against the valve seat 18 of the valve seat assembly 17.

The pressure on the outside of the valve 10, i.e., the pressure which could exist within the casing of a well, is communicated to the interior of the valve housing 11 through a plurality of apertures 40a extending through the side of the housing 11. When the valve 10 is placed into a conventional receiving side pocket mandrel connected in the tubing of a well (not shown), a pair of upper and lower seal portions 41 and 42 form a pressure seal against the inside surfaces of the mandrel and allow communication of the pressure within the tubing to the bellows 31 through an opening 40b in the top of the upper end cap 32 which extends down through a slot 40c in the upper end of the elbows 28 into the region around the bellows assembly 27. Similarly, the pressure within the tubing is also communicated through the apertures 14 to the lower side of the spherical valve stem 21. These two applications of tubing pressure apply an upward force on the valve stem 26 which acts against the set pressure of the valve produced by the downward force of the spring 33. When the pressure within the tubing overcomes the set pressure of the valve, set by the tension on the spring 33, the spherical valve stem 21 lifts off the seat 18 of the valve seat assembly 17 to admit the flow of pressurized fluids from within the casing of the well through the apertures 40, along the interior of the housing 11, through the choke apertures 24, along passageway through the valve seat assembly 17, through the aperture 15 and out the apertures 14 into the tubing of the well. Thus, it can be seen that the actual opening of the valve 10 to admit pressurized gas from within the casing of a well into the tubing thereof is a matter of a pressure balance between the pressure within the tubing and the set point of the valve which is adjusted by means of the tension on the spring 33 pushing downwardly against the stem of the valve 26. In this manner, the gas injection valve 10 is pressure operated and both the differential pressure between the casing and the tubing as well as the absolute pressure on the valve affect the degree and rate by which the spherical valve stem 21 moves off of the valve seat 18 to admit flow through the valve.

Figure 2:
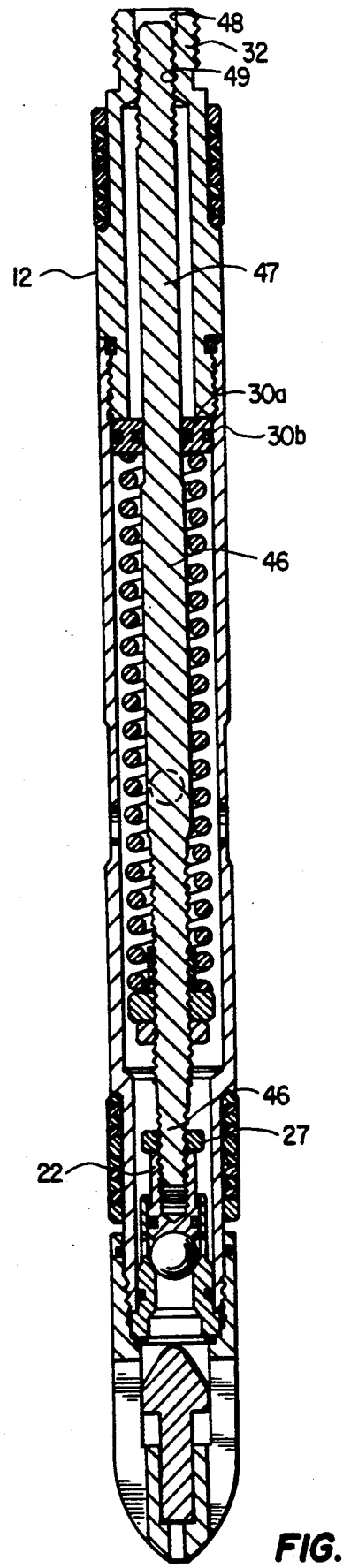
FIG. 2 is a longitudinal cross section view of the valve shown in FIG. 1 having been modified in accordance with the teaching of the present invention in order to measure certain parameters of the valve.

Referring to FIG. 2 there is shown an exemplary construction in which the gas lift valve of FIG. 1 is modified so that it no longer functions as a pressure actuated valve, but rather, a precisely manually adjustable valve with which measurements can be made upon the valve in accordance with the teachings of the present invention. Referring to FIG. 2, it can be seen that the stem 26 of the valve of FIG. 1 is replaced by means of a stem 46 the lower end of which is threadedly connected to the upper end of the socket portion of the valve stem assembly 22 and affixed thereto by means of the same lock nut 27. The stem 46, however, is not attached to the lower end of the bellows assembly 27 as shown in FIG. 1, but replaces the entire elbows assembly including the upper and lower seals 28 and 29. The upper end 47 of the stem 46 is sealed to the interior of the seal support ring 34 by means of the O-ring 30a and is threadedly engaged with the upper end cap 32 of the bellows housing 12. The open end 48 of the bellows housing 12 allows access to a diagonal screw slot (not shown) in the end of the stem 46 through which the stem may be rotated about the screw threads 49 to thereby change the position of the spherical valve stem 24 with respect to the seat 18 of the valve seat assembly 17. The replacement of the conventional valve stem 26 in the valve 10 with the stem 46 allows precise mechanical control over the fluid flow opening within the valve and hence, the measurement of the flow parameters of the valve without changing the geometry of the flow portions of the valve between the casing apertures 40 and the tubing apertures 14. This measurement procedure will be further explained below in connection with the detailed explanation of the method and system of the present invention.

It should also be understood that other pressure operated valves maybe similarly modified by replacement of stem portions, or otherwise, to enable precise mechanical control of the flow control opening within the pressure actuated valve. In this way, the necessary measurements can be made through a range of sizes of openings in the valve to gather the data necessary to practice the method and system of the present invention. The manner of valve stem replacement with respect to the particular illustrative valve shown above in FIGS. 1 and 2 is merely exemplary and one of ordinary skill in the art can discern how to temporarily modify the structure of other pressure operated valves, the flow parameters of which it is desired to measure in accordance with the system of the present invention.

Purpose of Valve Flow Parameter Testing

The flow characteristics of a pressure actuated valve are very important to the design of flow systems incorporating such valves. In particular, the need for accurate gas lift flow performance characteristics of each valve is an integral requirement of the technique of valve spacing in a gas lift production system. All gas lift valve spacing techniques assume that when gas is injected at a valve, the tubing flow gradient at the valve is reduced in accordance with a two-phase vertical flow gradient correlation. This reduction in tubing pressure is then reflected down the hole as a reduction in tubing pressure at each lower valve. Thus, the key to successfully spacing the gas lift valves in a gas lift well completion is accurately predicting the tubing pressure at each valve.

The gas injected into well tubing through a gas lift valve lightens the tubing flow gradient and thus, the differential pressure across the valve increases as the tubing pressure decreases for a constant casing pressure. The rate of gas injection at each valve is the result of the three parameters: (a) the flow characteristics of the valve; (b) the stem position of the valve; and (c) the differential pressure across the valve. As the tubing pressure decreases, the valve stem will throttle to a closed position rather than moving instantaneously from a full open to a full close position.

Current gas injection valve spacing techniques ignore the throttling affect of the gas lift valve and assume that the valve flow port is also full open and unobstructed when the valve is open. This assumption allows the use of a simple orifice flow equation to predict the gas flow performance of the valve and thereby enormously simplify the calculations involved in the design of a gas lift system. The most popular and widely accepted equation used for simple orifice flow is the Thornhill-Craver equation for fluid flow through a beam. This equation predicts increasing flow with increasing pressure differential, thus, the maximum flow through the valve could occur at the lowest tubing pressure given a constant casing pressure. However, the assumption that the valve flow port is always full open and unobstructed when the valve is open is contrary to virtually all tested valve performance data. The actual flow through the gas lift valve could be considerably less than the value calculated based upon the assumption. As a result the calculated tubing pressure at the valve is generally much lower than the actual tubing pressure. This error in calculated tubing pressure, based upon the erroneous assumption can cause unloading to become studied at an upper valve for lack of sufficient gas flow to achieve the gas liquid ratio (GLR) necessary to uncover the next lower gas lift valve in the tubing.

As also discussed above in connection with the prior art, the majority of gas lift valves performance characteristic testing which is currently does consists of performing a large number of tests upon live gas lift valves positioned in a fixture simulating a side pocket mandrel in a tubing at pressures which are normally encountered in unloading operations within a gas lift completion. The measured data are used to plot flow rate versus tubing pressure and the plots are analyzed to try and write an empirical equation which will predict the maximum flow through the valve and the tubing pressure at which that maximum flow will occur. The resulting empirical equations do not usually include any specific valve flow parameters and are equations of only a group of performance curves. This type of live valve testing is time consumingly expensive and only useful with the specific valve tested and at the specific pressures tested. Use of these types of equations to try and predict flow rate performance of a valve at pressures other than those at which the valve was actually tested can lead to sustantial errors. However, despite all its shortcomings, this type of live valve testing is the technique most commonly accepted in the industry.

One alternative to live valve testing analysis is to theoretically analyze the stem position of a gas lift valve with respect to the port and attempt to compute the pressure distribution throughout the valve. Since the stem position affects the flow rate and the pressure distribution within the valve, the pressure distribution on the valve surface also affects the stem position. Mathematical modeling of such a complex physical interaction of different parameters affecting flow through the valve is extremely difficult and prone to error. Such an analysis does not yield a practical solution to the accurate prediction of flow characteristics through a pressure operated valve.

It is well known within the process and power generation industry, as well as the petroleum industry to analyze the single phase flow performance of valves. Moreover, these industries have developed and adopted standards of testing valves which give accurate results for any particular valve geometry. The Instruments Society of America (ISA) and the American National Standards Institute (ANSI) have adopted a written specification (ISA-S75.02) which describes a method for testing valves which gives a characteristic flow coefficient ($C_v$). The parameter $C_v$ can be tested at modest pressures and is an appropriate indicator of flow performance of a valve at any pressure in that it is geometry dependent and not pressure dependent. The methods of measuring the characteristic flow coefficient account for all of the restrictions and obstructions in the fluid flow path through the valve by massing them together into one factor called $C_v$. The resulting value of $C_v$ is appropriate for either liquid or gas flow through the valve and in the case of liquid flow is defined in terxs of gallons per minute of flow per lbs. per square inch (PSI) of pressure differential across the valve.

The method of measuring characteristic flow coefficient, $C_v$, has the ability to account for changes in flow characteristics as a function of the valve stem travel whereas the Thoruhill-Craver equation does not. When the flow coefficient of a valve is experimentally measured the result is a graph of $C_v$ as a function of valve stem travel and this measurement alone would enable the accurate prediction of flow performance through the valve if the valve stem position was known at all times. However as discussed above the valve stem position of a production pressure operated gas injection valve changes continuously as the tubing pressure of the valve changes. Thus, in order to predict the flow performance from open to close of a pressure actuated valve it is necessary to know the valve stem position at all pressure conditions. Therefore, in addition to the $C_v$ data, a correlation is required in order to predict dynamic stem position based upon static measured parameters. This correlation is developed in accordance with the teachings of the present invention by using both the $C_v$ tests as well as additional live valve tests. The valve stem travel correlation accounts for valve dynamics such as spring rate, set pressure, and pressure distribution on the valve itself. The correlation developed in accordance with the system of the present invention is a dimensionless relationship between stem travel and differential pressure across the valve. The manner in which such correlation is developed for a particular valve is set forth below.

Measurement of Parameters

Figure 3:
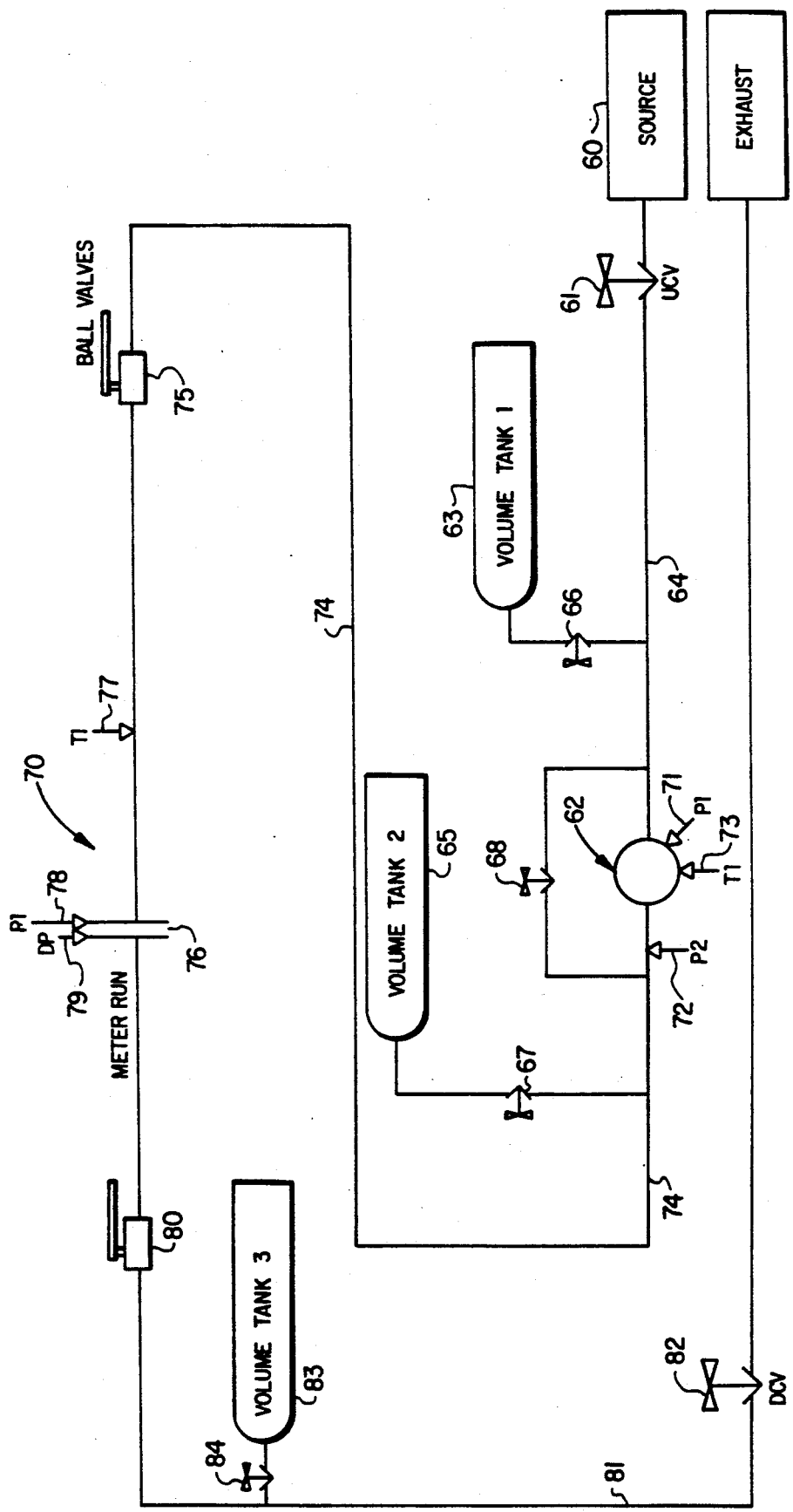
FIG. 3 is a schematic diagram of a flow testing circuit used in the system of the present invention.

Referring next to FIG. 3, there is shown a schematic diagram of illustrative flow circuitry which can be used in the method and system of the present invention to perform both the flow coefficient tests as well as the live valve tests in accordance with the present invention. Obviously, there are other flow and pressure measurement techniques which can be used to obtain the raw valve data used in the method and system of the present invention. As shown in FIG. 3, a source of air pressure 60 may comprise a large tank which serves as a pressure reservoir as well as a compressor feeding that tank. An upstream control valve 61 is connected to a test fixture 62 for the valve and a first volume tank 63 is connected to the test line 64 ahead of the test fixture 62 and a second test volume tank 65 is connected downstream. The test fixture 62 simulates a side pocket mandrel into which the exemplary gas lift valve is to be fitted for testing. The volume tanks 63 and 65 provide means for connecting additional gas flow through their respective control valves 66 and 67 to damp oscillations within the line 64 and stabilize the measurement of pressures across the test valve connected into the test fixture 62. A fixture control valve 68 is connected across the test fixture 62 and closed when it is desired to direct all of the flow through the valve connected into the test fixture 62. A upstream pressure sensor 71 is connected to the test fixture 62 on the upstream side of the valve while a downstream pressure sensor 72 is connected downstream. A temperature sensor 73 is connected to the test fixture 62 to give an accurate temperature measurement of the fluid flowing through the valve. Downstream of the test fixture 62 there is an exhaust line 74 which leads from the output of the test fixture 62 to a meter run 70. A wall valve 75 leads to a pressure measurement orifice plate 76 through a temperature sensor 77, a pressure sensor 78, and a differential pressure measurement sensor 79. An output ball valve 80 connects to an exhaust line 81 through a discharge control valve 82. A third volume control tank 83 is connected to the discharge line 81 through a valve 84 to damp oscillations of flow within the test system.

In the actual test system embodiment of FIG. 3 used to gather the illustrative data set forth below, the specific parameters of the configuration employed included the following equipment and features:

a) The upstream pressure transducer 71 was located on the hood of the side pocket fixture opposite the pocket ports;

b) The downstream pressure transducer 72 was located 12 inches downstream of the pocket on a 2inch pipe mounted 90° to the pipe;

c) The upstream flow control choke 61 as located 70 inches from the test fixture 62 mounted on 2" pipe;

d) The downstream flow control choke has located approximately 15' from the test fixture 62 with numerous bends in the flow line therebetween;

e) The upstream flow control choke was a teledyne Merla 2" thoroughly choke with a ½" port;

f) The downstream flow control choke was a Unibolt 2" Anglebody with a ½" port;

g) The pressure transducers 71 and 72 were Bournes transducers with + or −½% accuracy;

h) The orifice differential pressure transducer 79 was a Bournes transducer with + or −½% accuracy;

i) The temperature transducers 73 and 77 were located on the hood opposite the pocket ports and were + or −0.1° F. accuracy; and j) The hood inside diameter was 4" with pocket outside diameter of 2.308". The packet had eight 7/16" ports in it.

The testing facilities used to embody the testing system of FIG. 3 are preferably equipped with computer controlled monitoring capabilities which enable the instant analysis of test results. Such systems allow the ability to analyze and decide whether a test should be repeated within minutes of completing the test and accurately report the exact conditions of the test without judgmental influence. While the system in FIG. 3 is shown with the meter runs on the downstream side of the valve test fixture 62 they could equally be located on the upstream side of the valve test fixture 62. The pressure surge tanks 63, 65 and 83 are employed in order to dampen the control response at both the downstream control valve 82 as well as the upstream control valve 61.

The flow coefficient tests employed in the method and system of the present invention are preferably performed in accordance with ISA-S75.02 standards, which are hereby incorporated by reference. The data gathered and set forth below is merely an illustration of the practice of the present invention follow those standards but with one exception: the pressure drop across the test valve 62 was calculated as the difference between the upstream pressure at transducer 72 and downstream pressure at transducer 71, rather than measuring the actual pressure drop with a differential pressure transducer. While this may have the effect of introducing a slight amount of error into the measurements, such error is relatively insignificant. The test media used to gather the data set forth below has compressed air. When tests are run on a gaseous fluid to determine flow coefficient, $C_v$, different factors must taken into consideration depending on whether or not the fluid is compressible. If the pressures at which the gas is tested are not sufficiently high to render it incompressible the flow analysis equations used must account for the expansion factor, y, of the test gas, in order to accurately determine flow performance. The ISA standards include test and analysis procedures for air as a fluid in both the compressible and incompressible pressure ranges.

In accordance with the requirements of test standard ISA-S75.02 for the air pressures in the incompressible ranges, a minimum of 3 pressure differential were tested and the pressure drop ratio (DP/P1) was less than or equal to 0.02. That is, for pressure differential of 10, 20 and 30 PSIG, the upstream pressures are at least 1500 PSIG. This restriction is placed upon the test by the standard in order to ensure that the test media acts like an incompressible fluid In the exemplary tests made in accordance with the system of the present invention, three tests are performed with the upstream pressure at 1500 PSIG and the downstream pressure at 1490, 1480 and 1470 PSIG. For air pressures in the compressible ranges the test standard ISA-S75.02 requires more actual test data to ensure a reliable probability of accuracy. Thus, 6 exemplary tests are run with the upstream pressure at 100 PSIG and downstream pressures of 90, 80, 70, 50, 10 and atmospheric. The tests performed with the downstream pressures in the compressible range of the fluid are performed with the intent on collecting data to calculate the $X_t$ factor, as will be further discussed below. In actual practice of the present invention it is probably more practical to use the ISA test procedures for a compressible fluid because of the difficulties of continually and accurately measuring the high pressures used in the test procedures for an incompressible fluid. Data obtained from each procedure is included below for purposes of illustration.

$C_v$ Test Procedures

The illustrative gas lift valve to be tested in accordance with the system of the present invention is fitted with an adjustable valve stem, as shown in FIG. 2, which can be easily adjusted to select the travel distance of the valve stem from the valve seat. Stem travel is set by first screwing the stem all the way down until it contacts the seat of the valve and then taking a measurement from the end of the stem 46 to the end of the valve body with the stem in that position. The stem is then threaded out one increment at a time and the same measurement taken each time. The difference between the measurements with the valve completely closed and each of the incremental adjustments is the valve stem travel during each increment. All measurements are preferably made with calipers. For actual testing the valve is then installed in a fixture whose internal geometry resembles that of a side pocket mandrel within conventional tubing. The test hood is lowered over the fixture and locked into position and a test number is assigned and the computer initialized with data pertinent to that particular test. The illustrative gas lift valve used to gather the experimental data set forth below was a model 222RF1500 gas lift valve manufactured by Otis Engineering Corporation, the assignee of the present application. A similar illustrative gas lift valve, a model 222RF1002, is shown in FIGS. 1 and 2.

The downstream control valve 82 is first closed and the upstream control valve 61 opened enough to equalize the pressure within the entire system at approximately 100 PSIG. The downstream valve 82 is then opened and the downstream pressure allowed to drop to 90 PSIG while the upstream valve 61 is adjusted to maintain the 100 PSIG. All transducers are allowed to stabilize and then measurements are taken. This procedure is repeated for downstream pressures of 80, 70, 50, 10 and atmospheric. Next, the downstream valve 82 is closed and the entire system equalized at 1500 PSIG. Again the downstream pressure is allowed to drop 10 PSIG while maintaining constant upstream pressure. The downstream pressures of 1490, 1480 and 1470 PSIG are tested and then the entire system is blown down to atmospheric pressure. The hood is removed from the test fixture 62 and the valve stem travel remeasured to ensure that it had not moved during the test.

The above procedure is then repeated with the valve stem adjusted to increasing amounts of travel away from the valve seat. When the measured difference in flow rate between any two $C_v$ tests does not change, e.g., the change is less than 10%, it is assumed that the valve is full open and the stem is no longer an influence on the performance of the valve. At this point the valve is removed from the fixture and the chokes are changed in the valve and the entire procedure repeated for a new choke size of that particular valve.

Calculation of $C_v$

It should noted that there are various known relationships for determining the flow coefficient of a flow control device, such as a valve, as a function of the geometry of the valve. While different ones of these relationships may be used in the practice of the present invention, the flow coefficient relationship used as the ISA standard and the ISA standard test procedures are employed herein as being exemplary for use in the method and system of present invention. Using the test data obtained in accordance with 6.1 of the ISA-S75.02 standard, i.e., for pressure values in the incompressible regions, the $C_v$ factor for each particular valve was calculated per section 7.1 of the standard as follows:

$$C_v = q/(N7*P1)* SQR(T1*G_g/x)$$

where:

q = Standard cubic feet per hour (SCFH);
N7 = 1360 (From table 3 of ISA-S75.02);
P1 = Absolute upstream pressure (PSIA);
T1 = Test media temperature in degrees Rankine;
$G_g$ = Specific gravity of test media (Air = 1.0); and
x = Pressure drop ratio (dP/P1).

The $C_v$ factor is determined by calculating the arithmetic average of three tests on the valve.

The data collected per the measurements in accordance with 6.3 of the ISA-S75.02, i.e., for pressure values in the compressible regions, standard are analyzed as follows:

$$Y*C_v = q/(N7*P1) * SQR(T1*G_g/x)$$

where:

$Y = 1-(x / (3*Fk*X_t))$;
$Fk = k /1.4$; and
k = Ratio of specific heats (Air = 1.4).

The product of Y*Cv is then plotted as the dependent variable as a function of x. A straight line is then fitted to the points and no point may deviate more than 5% from the line to ensure that each point is a reliable value. In addition, at least one point must satisfy the following conditions:

$$Y*C_v >= 0.97*Y*C_{vo}$$

and $$Y*C_v <= 0.83*Y*C_{vo}$$

where:

$Y*C_{vo}$ is a data point where x = 0 (approx).

The value of $C_v$ is then read from the plot where the line crosses the Y axis and $X_t$ is (the factor describing the pressure ratio at which flow through the valve is no longer proportional to the pressure differential) read from the x axis by projecting a line down from the point on the line where $Y*C_v = 0.667*C_v$.

These calculations may be performed on the data for each test using standard spreadsheet programs, e.g., LOTUS 1-2-3 version 2.0. A sample calculation is set forth in Table 1 below.

TABLE 1

DATE FILE C: 123 CVDATA
TEST NUMBR: 89062704  DEGREE OF FIT 0.973
VALVE TYPE: 222RF1500  LINEAR XT 0.857
CHOKE: (1) ⅛ DIA  LINEAR CV 0.376
TRAVEL: 0.02  AVE CV 0.404

| P1 | P2 | TEMP | MSCFD | RATIO | $C_v$ | % DEVIATION |
|---|---|---|---|---|---|---|
| 100.63 | 96.25 | 68 | 11.63 | 0.038 | 0.364 | -1.6 |
| 100 | 90 | 68 | 17.25 | 0.087 | 0.359 | -1.2 |
| 100.63 | 79.38 | 68 | 24.37 | 0.184 | 0.347 | -0.6 |
| 99.38 | 70 | 68 | 29.25 | 0.258 | 0.356 | 5.0 |
| 100.63 | 49.38 | 68 | 33.75 | 0.444 | 0.309 | -0.6 |
| 98.75 | 8.13 | 68 | 36.75 | 0.799 | 0.255 | -1.5 |
| 101.25 | 2.5 | 68 | 38.25 | 0.852 | 0.252 | 0.1 |
| 1500 | 1490 | 66 | 69.75 | 0.007 | 0.398 | |
| 1500.63 | 1480 | 66 | 101.25 | 0.014 | 0.402 | |
| 1500 | 1468.75 | 65 | 127.13 | 0.021 | 0.410 | |

In the upper portion of Table 1, the rows on the left indicate pertinent data with regard to the test itself while the rows on the right give the results of the analysis of the data. In the lower part of Table 1, the test data are shown. In the column marked "RATIO" are pressure ratios calculated in accordance with the following relationship:

$$X = (P1 - P2)/ (P1 + 14.7)$$

where:

P1 = pressure upstream of test fixture (PSIG); and
P2 = pressure downstream of test fixture (PSIG).

The column marked "$C_v$" includes values of flow coefficient calculated in accordance with the equations previously given. The data values in the middle part of Table 1, are used to calculate $C_v$ in accordance with equation (2), above, and the data values set forth in the bottom part of Table 1 are used to calculate $C_v$ in accordance with equation (1). The last column marked "% DEVIATION" indicates the difference between the tested $C_v$ and the straight line fit of the data points.

Figure 4:
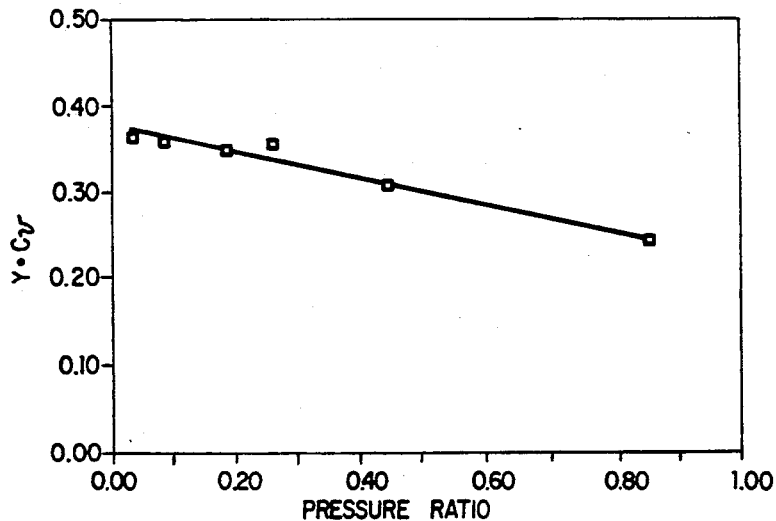
FIG. 4 is a graph showing the product of expansion factor times flow coefficient of a valve plotted as a function of the ratio of the measured pressure drop across the valve to the absolute upstream pressure on the valve.

A straight line fit may be accomplished in accordance with standard programs, such as the LOTUS 1-2-3 internal regression analysis program. One result of this analysis is a term called "degree of fit", which indicates how well the data fits the computed straight line. A value of 1.0 indicates a perfect fit while a value of 0 indicates random data. The straight line fit of data from Table 1 is illustrated in FIG. 4. The value "linear $X_t$" is the $X_t$ factor determined from the data in accordance with section 6.3 of the ISA-S75.02 standard. The "linear $C_v$" value is the flow coefficient factor determined from the data in accordance with section 6.3 of the standard. The "AVE.$C_v$" is the average of the $C_v$ value in the lower part of the graph and represents an analysis in accordance with section 7.1 of the standard.

Figure 5:
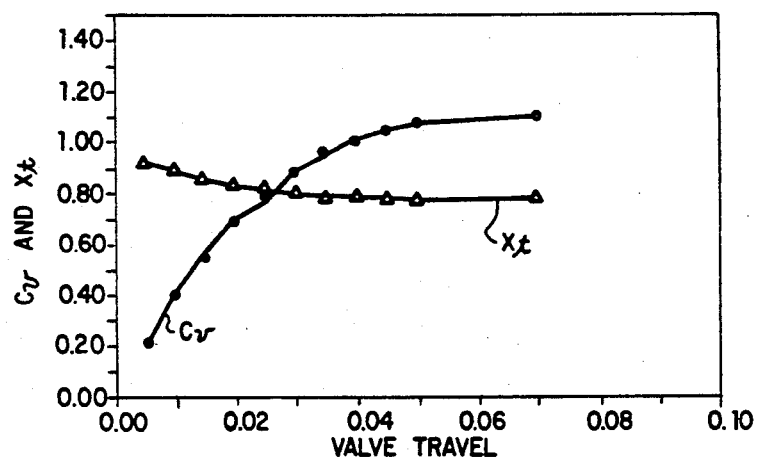
FIG. 5 is a combined graph of valve flow coefficient ($C_v$) and terminal pressure drop ratio $X_t$ as a function of valve stem travel.

The $C_v$ and $X_t$ factors for a given size in a particular valve are then plotted against stem travel, as illustrated in FIG. 5. The data points on the graph are used to find a third order least square fit of a curve that could run through the data points. A sample of the data and their analysis are shown in Table 2, below, and an illustrative graph thereof is shown in FIG. 5.

TABLE 2

| VALVE: 222RF1500 | NUMBER OF TEST POINTS: 12 | | | |
|---|---|---|---|---|
| CHOKE: (3) ⅛ CHOKE | | $X^3$ | $X^2$ | X | CONSTANT |
| FILENAME | $C_v$ COEFFICIENTS | 2684.838 | -606.457 | 44.94636 | 0.005107 |

TABLE 2-continued

| CVDATA | RF15CV02 | X$_t$ COEFFICIENTS | | −687.676 | 140.6637 | −8.95884 | 0.964623 |
|---|---|---|---|---|---|---|---|
| TRAVEL | C$_v$ | X$_t$ | DATA | CALC C$_v$ | CALC X$_t$ | C$_v$ ERR | X$_t$ ERR |
| 0.005 | 0.21 | 0.935 | TEST | 0.215013 | 0.923259 | −0.00501 | 0.011740 |
| 0.01 | 0.39 | 0.89 | FILL | 0.396609 | 0.888413 | −0.00660 | 0.001586 |
| 0.015 | 0.58 | 0.84 | TEST | 0.551911 | 0.859569 | 0.028088 | −0.01956 |
| 0.02 | 0.69 | 0.835 | FILL | 0.682930 | 0.836210 | 0.007069 | −0.00121 |
| 0.025 | 0.75 | 0.81 | TEST | 0.791681 | 0.817822 | −0.04168 | −0.0782 |
| 0.03 | 0.9 | 0.8 | FILL | 0.880177 | 0.803888 | 0.019822 | −0.00388 |
| 0.035 | 0.94 | 0.81 | TEST | 0.950432 | 0.793893 | −0.01043 | 0.016106 |
| 0.04 | 1.01 | 0.785 | FILL | 1.004460 | 0.787320 | 0.005539 | −0.00232 |
| 0.045 | 1.05 | 0.8 | TEST | 1.044273 | 0.783655 | 0.005726 | 0.016344 |
| 0.05 | 1.07 | 0.78 | FILL | 1.071887 | 0.782381 | −0.00188 | −0.00238 |
| 0.07 | 1.1 | 0.78 | FILL | 1.100612 | 0.790884 | −0.00061 | −0.01088 |
| 0.1 | 1.12 | 0.79 | FILL | 1.120011 | 0.787700 | −0.00001 | 0.002299 |
| 0 | 0 | 0 | | 0.005107 | 0.964623 | −0.00510 | −0.96462 |
| 0 | 0 | 0 | | 0.005107 | 0.964623 | −0.00510 | −0.96462 |
| 0.445 | 9.81 | 9.855 | | | | | |

A least squares curve fit is used to minimize the difference between the sum of the squares of the test data points and the sum of the squares of the calculated data points. The form of a third order equation correlating these data is set forth as follows:

$$Y = N1 \cdot \hat{X3} + N2 \cdot \hat{X2} + N3 \cdot X + N4, \quad (3)$$

where:
Y = Dependent data point;
X = Independent data point; and
N1, N2, N3, N4 = Coefficients from curve fit.

The first three columns of data set forth in Table 2 are taken from the C$_v$ analysis for a given choke size of a particular valve. The fourth column "data" indicates whether the values from the test data are inserted as additional data points to obtain a better curve fit. The columns marked "CALCC$_v$ and CALCX$_t$" are the calculated values using the coefficients found in the least squares fit. The columns marked "C$_v$err" and "X$_{eer}$" are the difference between the calculated and the actual test data. The coefficients found from the C$_v$ and X$_t$ parameters are given in the upper part of Table 2.

Interpolated Factors

For purposes of illustration herein not all possible choke sizes of a particular valve have been tested. For the untested choke sizes, a curve has been approximated into the range between two tested chokes. These data have then been used to find a least square curve fit as in the tested cases.

As would be expected the magnitude of the C$_v$ factor increases with increasing choke size. In addition, the maximum C$_v$ value is reached at increasingly greater values of stem travels as choke sizes are increased. In the case of the largest choke size included in the data, i.e., ⅜" diameter, the total allowable travel of the valve stem is approximately 0.130". Therefore, in the case of the largest choke size with the valve in the full open condition the stem begins to throttle the flow as soon as the valve begins to close. This indicates that choke sizes larger than ⅜" diameter begin to have an adverse affect on the operation of the valve.

The X$_t$ factor describes the pressure ratio at which flow through the valve is no longer proportional to pressure differential. The lower this number, the sooner the valve reaches its critical flow values. A summary of the X$_t$ correlation coefficients is set forth below in Tatle 4.

An analysis of the test data shown in Table 2 indicates that the use of computed differential pressure, rather than a measured differential pressure, did in fact reduce the accuracy of the test although only slightly. This is particularly noticeable for small pressure drops and high upstream pressures.

A summary of the calculated C$_v$ correlation coefficients is shown below in Table 3.

TABLE 3

| SUMMARY OF C$_v$ CORRELATION COEFFCIENTS | | | | |
|---|---|---|---|---|
| CHOKE SIZE | M1 | M2 | M3 | M4 |
| 4/32 | 19427 | −1630 | 44.76 | −.0124 |
| 5/32 | 2815 | −515 | 29.52 | .0784 |
| 6/32 | 2644 | −552 | 37.33 | .0386 |
| 7/32 | 2684 | −606 | 44.95 | .0051 |
| 8/32 | 854 | −345 | 42.09 | .0460 |
| 9/32 | 708 | −351 | 49.26 | .0051 |
| 10/32 | 355 | −327 | 55.01 | −.0007 |
| 11/32 | 214 | −296 | 57.02 | −.0231 |
| 12/32 | 1359 | −535 | 71.91 | .0543 |

The flow coefficient C$_v$ was calculated using the following equation:

$$C_v = M1 \cdot x_d^3 + M3 \cdot x_d + M4$$

where:

M1, M2, M3, M4 = from table for choke size; and
xd = dynamic stem travel.

The flow rate through the valve is then calculated using the ISA standard equation as follows:

$$MSCFD = 36.68 \cdot C_v \cdot Pcf \cdot SQR(x / R \cdot Sg)$$

where:
36.68 = conversion from SCFH to MSCFD;
C$_v$ = as calculated above;
Pcf = flowing casing pressure opposite valve;
R = temperature in degrees Rankine;
S$_g$ = specific gravity of gas; and
x = (Pcf − Ptf)/ (Pcf + 14.7).

A summary of the X$_t$ correlation coefficient is set forth below in Table 4.

TABLE 4

| SUMMARY OF X$_t$ CORRELATION COEFFICIENTS | | | | |
|---|---|---|---|---|
| CHOKE SIZE | P1 | P2 | P3 | P4 |
| 4/32 | −24128 | 1723 | −34.48 | 1.02 |
| 5/32 | −1084 | 211.5 | −10.61 | .96 |
| 6/32 | −651 | 142.2 | −8.22 | .94 |
| 7/32 | −687 | 140.7 | −8.96 | .96 |
| 8/32 | −651 | 168.7 | −12.00 | .98 |
| 9/32 | −805 | 216.3 | −15.69 | .99 |
| 10/32 | −1349 | 332.0 | −22.66 | 1.04 |
| 11/32 | −1038 | 281.9 | −20.98 | .99 |

TABLE 4-continued

SUMMARY OF $X_t$ CORRELATION COEFFICIENTS

| CHOKE SIZE | P1 | P2 | P3 | P4 |
|---|---|---|---|---|
| 12/32 | −1040 | 275.6 | −20.87 | .96 |

The pressure ratio limit is then calculated using the following equation:

$$X_t = P1*x_d^3 + P2*x_d^2 + P3*x_d + P4$$

where:
P1, P2, P3, P4 = from table for choke size; and
$x_d$ = dynamic stem travel.

The pressure ratio used in the calculation of the flow rates must less than the pressure ratio limit calculated in accordance with formula (6) above. The pressure ratio is calculated in accordance with the following relationship:

$$X = (Pcf - Ptf) / (Pcf + 14.7)$$

where:

Pcf = flowing casing pressure; and
Ptf = flowing tubing pressure.

LIVE VALVE TESTING

Valve Closing Pressure ($P_{vc}$)

When the valve stem of a pressure actuated valve is lifted off the seat, its position is determined by the force balance on the stem between the pressure setting on the pressurized bellows or spring and the actuating force tending to open the valve. In the case of a production pressure operated gas injection valve of the type shown in FIG. 1, a spring is used to supply the closing force on the stem and the tubing pressure supplies the opening force on the stem. When the test valve used to gather the data set forth below is closed the tubing pressure acts on approximately 90% of the bellows area and the casing pressure acts on the remaining 10%.

In general the closing pressure of the gas lift valve should be used in the calculation in accordance with the present invention. The closing pressure of an injection pressure operated valve ($P_{vc}$) is defined as that casing pressure at which the valve just opens for a given set pressure and zero tubing pressure. The closing pressure ($P_{vc}$) of a production pressure operated valve is the set pressure of the valve ($P_{vc}$) which is defined as that tubing pressure at which the valve just begins to open when the casing pressure is 0. The $P_{vc}$ of a valve is found by testing the valve with a high pressure low volume source. This tested value of $P_{vc}$ is considered to be the pressure at which the valve will close. In order to compensate for the 10% casing pressure affect in the particular production pressure operated valve with which the illustrative test data was gathered, the following formula is used to calculate the test $P_{vc}$:

$$\text{Test } Pvc = ptf + Pcf*(As - Ap)/(Ap + Ab - As))$$

where:
Ptf = Tubing flowing close pressure;
Pcf = Casing flowing close pressure;
As-Ap = 0.021; and
Ap+Ab-As = 0.209.

therefore:

$$\text{Test } Pvc = Ptf + 0.10*Pcf.$$

Static stem travel, $X_s$, is calculated in accordance with the following relationship:

$$Xs = Ab*(Ptf - Pvc)/k$$

where:

Ab = effective bellows area (0.23 sq in);
Ptf = flowing tubing pressure (psig);
Pvc = valve set pressure (psig);
k = valve spring rate (lbf/in); and
For 222RF1500 gas lift valve k = 358 lbf/in;
For 222RF1600 gas lift valve k = 608 lbf/in.

Dynamic Stem Travel

For any particular given pressure conditions, the valve stem of a pressure actuated valve will achieve an equilibrium position to satisfy the force balance on the valve stem. At this position the fluid will be flowing at some rate through the space between the stem and the valve seat. This rate is a function of the valve $C_v$ factor and the differential pressure across the valve. Live valve tests are used in the system of the present invention to determine a continuous range of equilibrium positions along with the flow rate through the valve for each position. These tests are used to find a correlation between dynamic stem travel and the static stem travel of the valve.

The dynamic stem position of a valve being tested can be inferred with the use of a plot of $C_v$ as a function of valve travel if it is assumed that $C_v$ for the live valve test is the same as that calculated previously using data obtained with the ISA test standard. This is a valid assumption since the valve, the test stand, and the test media are all the same and since the $C_v$ factor is independent of pressure during the test. As gas flows through the valve it accelerates at each reduction in flow area through the valve and decelerates at each increase in flow area. At each one of these changes in flow area, the gas changes in density and pressure. In the case of a pressure actuated gas injection valve of the type illustrated in FIG. 1, the major restriction is in the choke upstream of the valve seat and port. However as the valve stem begins to throttle closed, the stem/seat interface becomes the major restriction When the valve stem becomes an obstruction in the fluid flow path, it causes the gas to accelerate and thus its pressure decreases. The magnitude of the pressure reduction can be quite large as in the case of a square edged orifice and a vena contract will form at some distance downstream of the restriction, at the same point where the tubing pressure is being sensed.

When the valve stem is fully closed the tubing pressure sensed by the bellows of the gas injection valve is the same as that read on a gauge. When the valve is open and flowing the pressure sensed at the end of the valve stem is a function of the pressure of the valve stem position and the differential pressure across the valve. This pressure is not the same as the station pressure read on a gauge.

In summary, the static stem travel and the dynamic stem travel are not the same parameters. Static stem travel can be computed quite easily using equation (9) above but dynamic stem travel cannot be so computed. Dynamic stem travel is a function of the pressure sensed at the end of the stem. This pressure changes as a function of the valve stem position and, thus, the purpose of the live valve test is to determine the dynamic stem travel parameters.

Live Valve Test Procedures

The live valve tests are conducted by again reconfirming the illustrative pressure actuated valve in accordance with the illustration of FIG. 1 so that the threaded solid valve stem of FIG. 2 is removed and replaced with the bellows and stem subassembly of FIG. 1 as discussed above, the live valve of FIG. 1 has the same internal flow geometry as the valve used for the $C_v$ test and illustrated in FIG. 2. The valve of FIG. 1 as installed in the same simulated side pocket mandrel fixture and the hood lowered and locked.

Referring again to FIG. 3, the downstream control valve 82 is closed and the pressure increased on the system. The particular illustrative valve being tested is 90% tubing sensitive and therefore requires a by-pass valve to be open in order that pressure can be exerted on the tubing in the system and thus, by-pass valve 68 across the fixture 62 is used. At the point in time that the tubing pressure reaches the valve closure pressure ($P_{vc}$), casing pressure drops slightly and the tubing pressure increases to system pressure. The by-pass valve 68 is then closed and the system pressure increased several hundred psig above the valve Pvc. At this point the valve is ready for testing.

The downstream control valve 82 is open and the downstream pressure allowed to drop to a specified value while the upstream pressure is maintained at a near constant value. At this flow condition, a pause is required to allow the dynamic condition to stabilize and then readings are taken. This procedure is repeated for several downstream pressures until the valve closes. Typically, three to seven downstream pressures are recorded per test.

The entire procedure above is repeated for a different upstream pressure. Typically, for a given choke size and Pvc, three upstream pressures are tested. At the completion of these tests, the valve is removed from the fixture and the choke size of the valve changed so that the entire procedure can then be repeated. Typically, three choke sizes in each valve are tested.

When the above tests are completed the valve is removed and the Pvc changed and the entire procedure repeated. It should be noted that the fluid valve may close fairly quickly when the tubing pressure approaches the valve Pvc. Therefore, considerable care is required to obtain such readings near the valve Pvc. As previously mentioned rapidly changing tubing pressure can cause erroneous flow rate readings and the data points collected at pressures near the value of Pvc must be viewed with this in mind.

Live Valve Test Results

The data obtained from the live valve tests consists of a recording of the upstream and downstream pressures, along with temperature and flow rates. Next, the flow rate is plotted as a function of the tubing pressure for each test. A computer can be used to create such plots with a typical plot of such values being shown in FIG. 6.

Figure 6:
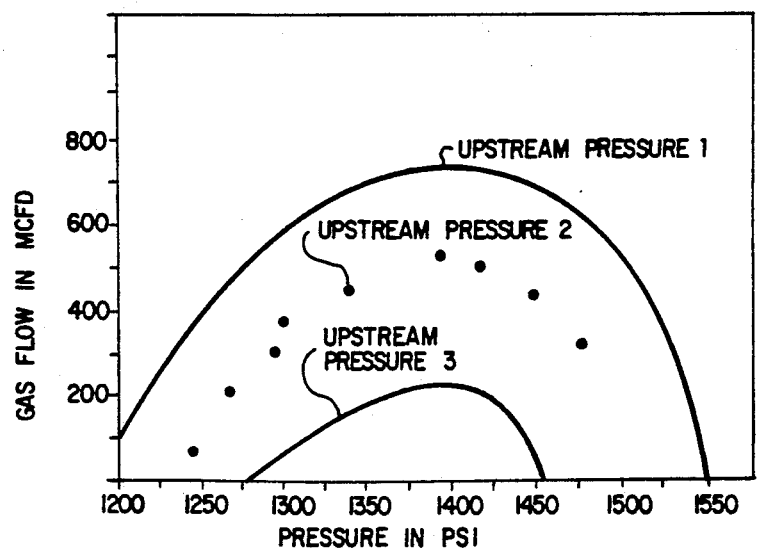
FIG. 6 is a graph of gas flow through the valve as a function of absolute downstream pressure on the valve.

As noted in FIG. 6, the flow rate through the valve initially increases with increasing differential pressures and then begins to decrease with increasing differential pressures. The decrease in flow rate with increasing differential pressures is a result of the valve stem throttling to a closed position and thus constructing the flow path through the valve. FIG. 6 is a typical graph of both pressure operated and production operated gas lift valves.

Analysis of Live Valve Tests

When the flow control valve is open and flowing, the valve stem will achieve an equilibrium position which satisfies the force balance on the bellows of the valve. At such an equilibrium position the flow rate through the valve is a function of the $C_v$ factor of the valve and the differential pressure across the valve. It is assumed that the $C_v$ factor for the live valve test is the same as the one tested with the fixed stem. This is likely a valid assumption since the valve, the test stand and the test media are all the same and since the $C_v$ factor of the valve is independent of pressure. At each data point on the graph of flow rate through the valve as a function of the pressure, as shown in FIG. 6, the Cv factor can be computed using the same ISA equation used during the Cv test as follows:

$$C_v = MSCFD/ 36.67/ Pcf / SQR(x/ (R*Sg))$$

The $C_v$ factor calculated in accordance with formula (10) above can be used to infer the dynamic stem position of the valve. Using the calculated $C_v$ and the $C_v$ correlation developed previously, the dynamic stem position can iteratively back-calculated in accordance with the following procedure:

Assume an $x_d$ and calculate an Assumed $C_v$ as follows:
Assumed $Cv = M1*x_d^3 M2*x_d^2 + M3*x_d + M4$. If this Assumed $C_v$ is not the same as that tested, then repeat until the tested and Assumed $C_v$ are the same.

The accuracy of the inferred stem position is dependent upon the accuracy of the $C_v$ test data, the live valve test data, and the accuracy of the $C_v$ correlation curve. While a fair amount of error may be expected on each test, with a sufficient number of tests a pattern or statistical average should produce an accurate indication of stem travel.

PERFORMANCE MODEL DEVELOPMENT

Travel Correlation

Determining the dynamic stem position of the valve as a function of the static stem position requires a correlation which can account for choke size, set pressure of the valve, pressure differential across the valve, and other valve parameters such as spring rate and bellows area. The rest desirable correlation would be a dimensionless value using easily measurable values. While a number of different correlations are possible, the following correlation has, if used in accordance with the teachings of the present invention been found to work with a high degree of success:

$$xd/xs = f(dP/Ps)$$

where:

xd = dynamic stem travel (inches);
xs = static stem travel (inches);
dP = differential pressure across valve (Pcf−Ptf);
Ps = pressure spread of valve (Pcf−Pvc).

Figure 7:
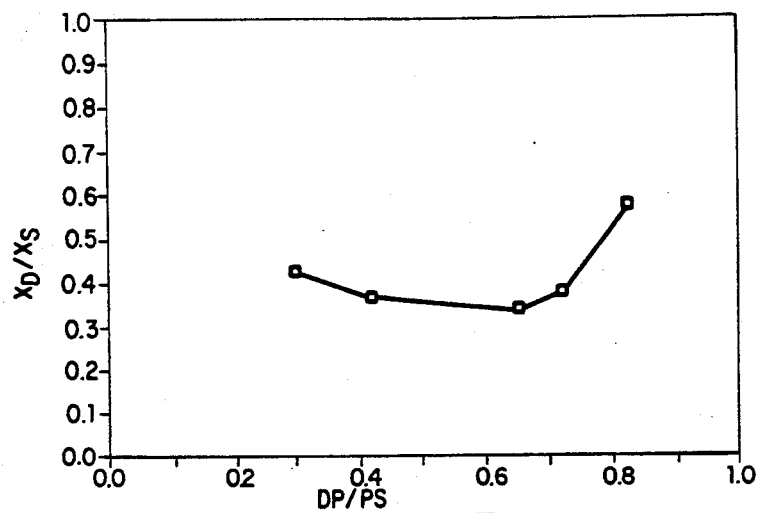
FIG. 7 is a graph of the ratio of dynamic stem travel to static stem travel as a function of the ratio of the differential pressure across the valve (Pcf−Ptf) to the pressure spread of the valve (Pcf−Pvc)

For each of the live valve tests the ratios of dynamic stem travel to static stem travel (Xd/Xs) were computed and plotted as a function of the changing pressure over the pressure spread of the valve (dP/Ps). A collection of those calculations is shown in Table 5, below and a sample plot of those data is shown in FIG. 7.

TABLE 5

| DATA FILE C: CVDATA | | | | CORRELATION COEFFICIENTS | | | |
|---|---|---|---|---|---|---|---|
| TEST NUMBER: 89062811 | | | | $X^3$ | $X^2$ | X | CONSTANT |
| VALVE TYPE: 222RF1500 | | Cv | | 1359.34 | −535.10 | 71.92 | 0.05 |
| CHOKE: (4) 3/16 DIA | | Xt | | −1039.91 | 275.61 | −20.87 | 0.96 |
| CLOSE PRESSURE: 660.0 | | BELLOWS | | 0.23 | SPRING: | 358.00 | |
| P1 | P2 | TEMP | MSCFD | CV | TRAVEL | XD/XS | DP/PS |
| 852 | 794 | 78.20 | 639 | 2.026 | 0.037 | 0.424 | 0.302 |
| 853 | 771 | 78.20 | 595 | 1.585 | 0.026 | 0.365 | 0.425 |
| 867 | 731 | 78.20 | 512 | 1.051 | 0.016 | 0.340 | 0.657 |
| 860 | 715 | 78.20 | 464 | 0.926 | 0.014 | 0.382 | 0.725 |
| 836 | 691 | 78.20 | 408 | 0.826 | 0.012 | 0.577 | 0.824 |
| 785 | 661 | 78.20 | 370 | 0.835 | 0.012 | 18.678 | 0.992 |
| 717 | 624 | 78.20 | 320 | 0.872 | 0.013 | −0.549 | 1.632 |
| 0 | 0 | 0.00 | 0 | ERR | 0.006 | −0.013 | 0.000 |
| 0 | 0 | 0.00 | 0 | ERR | 0.004 | −0.009 | 0.000 |
| 0 | 0 | 0.00 | 0 | ERR | 0.002 | −0.005 | 0.000 |
| 0 | 0 | 0.00 | 0 | ERR | 0.000 | 0.000 | 0.000 |
| 0 | 0 | 0.00 | 0 | ERR | 0.000 | 0.000 | 0.000 |

Pattern Recognition

From a graph of each test, the next step in the method of the present invention is to look for a common pattern and then to develop an equation to describe the curve of that pattern. It should be noted that to look at any individual graph and then fit a curve to that graph exactly will lead to a certain amount of error when that curve is used for any other graph. As discussed above, there is a certain amount of error to be expected in both the data collection process and in the calculations, therefore, an overall pattern recognition should be used.

Figure 8:
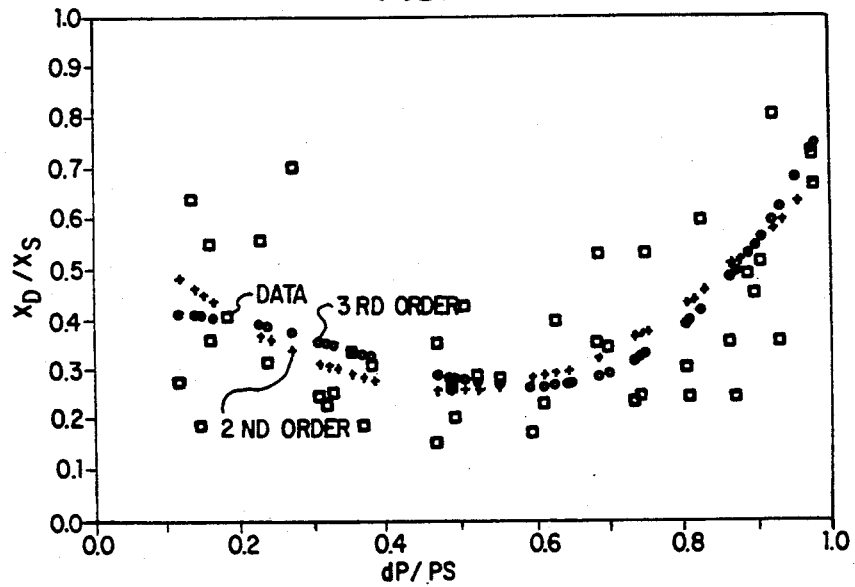
FIG. 8 is a graph of the functions shown in FIG. 7 for all pressures measured for a particular valve at a particular choke size for that valve.

The values of Xd/Xs and dP/Ps for all tests with ⅛ size choke are calculated and plotted on a graph as shown in FIG. 8. In addition, a second and third order least squares fit is used with these data to plot a curve through all of the data points. This procedure is followed for all three of the choke sizes used during the live valve test.

The general trend of the curve is to start at a Xd/Xs value of one at dP/Ps equals 0 and decrease with increasing dP/Ps until a minimum value is reached at about dP/Ps equal 0.6. The curve then turns sharply upward toward a value of Xd/Xs equal one at dP/Ps equal one. This trend is in agreement with the theoretical idea of how the valve should react under these conditions. The value and point of minimum Xd/Xs does seem to change with choke size. In addition, there also seems to be some dependence on the ratio of Pvc/Pcf.

Figure 10:
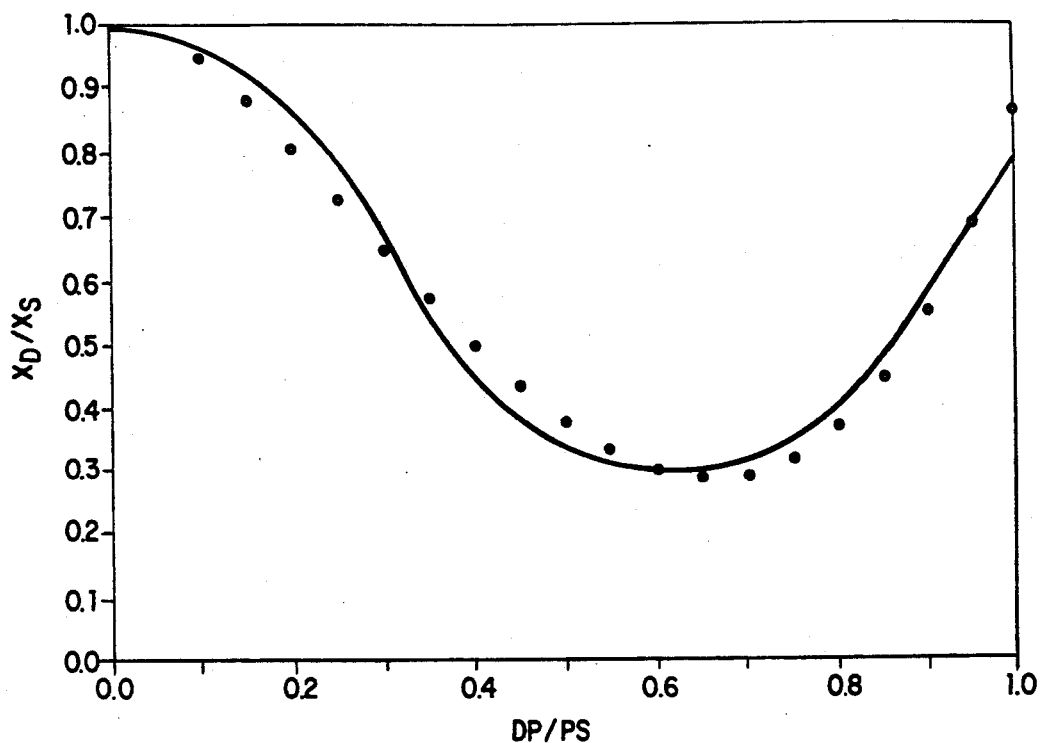
FIG. 10 is a graph of dynamic stem travel to static stem travel as a function of the ration of the differential pressure across the valve to the pressure spread of the value.

Using the composite graphs of the travel correlation as a guide, curves for Xd/Xs are estimated for each choke size. This curve is then used to find third order coefficients using a least squares analysis. The data and an associated graph for a 4/32 choke is shown in Table 6 below and in FIG. 10, respectively.

TABLE 6

| CORRELATION SUMMARY | | | | |
|---|---|---|---|---|
| 4/32 CHOKE | | | 3.342193 | N1 |
| | | | −2.67176 | N2 |
| THIRD ORDER COEFFTCIENTS | | | −0.86804 | N3 |
| | | | 1.057646 | N4 |
| xd/xs | dp/ps | CALC | ERROR | |
| 1.000 | 0.000 | 1.058 | −0.058 | |
| 0.990 | 0.050 | 1.008 | −0.018 | |
| 0.980 | 0.100 | 0.947 | 0.033 | |
| 0.920 | 0.150 | 0.879 | 0.041 | |
| 0.860 | 0.200 | 0.804 | 0.056 | |
| 0.780 | 0.250 | 0.726 | 0.054 | |
| 0.670 | 0.300 | 0.647 | 0.023 | |
| 0.560 | 0.350 | 0.570 | −0.010 | |
| 0.430 | 0.400 | 0.497 | −0.067 | |
| 0.360 | 0.450 | 0.431 | −0.071 | |
| 0.320 | 0.500 | 0.373 | −0.053 | |
| 0.310 | 0.550 | 0.328 | −0.018 | |
| 0.300 | 0.600 | 0.297 | 0.003 | |
| 0.290 | 0.650 | 0.282 | 0.008 | |
| 0.300 | 0.700 | 0.287 | 0.013 | |
| 0.340 | 0.750 | 0.314 | 0.026 | |
| 0.400 | 0.800 | 0.364 | 0.036 | |
| 0.470 | 0.850 | 0.442 | 0.028 | |
| 0.580 | 0.900 | 0.549 | 0.031 | |
| 0.690 | 0.950 | 0.687 | 0.003 | |
| 0.800 | 1.000 | 0.860 | −0.060 | |
| | | | 1.058 −1.058 | |
| 12.35 | 10.5 | | DATA POINTS | |
| sum y | sum x | | 21 | |

This procedure was then repeated for all other choke sizes. A summary for the coefficients of the third order equation is given in Table 7, set forth below.

TABLE 7

| SUMMARY OF TRAVEL CORRELATION COEFFICIENTS | | | | |
|---|---|---|---|---|
| CHOKE SIZE | N1 | N2 | N3 | N4 |
| 4/32 | 3.34219 | −2.6717 | −0.868 | 1.0576 |
| 5/32 | 2.90217 | −2.2344 | −0.848 | 1.0348 |
| 6/32 | 2.08877 | −1.1926 | −1.072 | 1.0152 |
| 7/32 | 1.79938 | −0.8930 | −1.027 | 0.9702 |
| 8/32 | 1.68242 | −0.5404 | −1.276 | 0.9927 |
| 9/32 | 1.36845 | 0.0025 | −1.509 | 0.9937 |
| 10/32 | 0.96564 | 0.6683 | −1.777 | 0.9934 |
| 11/32 | 0.40157 | 1.5702 | −2.125 | 0.9923 |
| 12/32 | 0.18692 | 1.7918 | −2.106 | 0.9537 |

Referring to Table 7, above, the coefficients shown therein are used in the equation set forth below to find the dynamic stem travel of the valve:

$$x_d = x_s[N1 \cdot (dP/P_s)^3 + N2 \cdot (dP/P_s)^2 + N3 \cdot (dP/P_s) + N4]$$

The computed static stem travel may in some cases exceed the total allowable stem travel, i.e., 0.130 inches, of the valve. Even so, the correlation relationship used in the system of the present invention requires that the actual computed value be used to calculate the dynamic stem travel.

The $C_v$ correlation curves may yield a value for dynamic travel that is well beyond the phYsical travel limit, however when this happens a limit must be set on the maximum $C_v$. From the $C_v$ tests, the limiting values set forth below in Table 8 was developed.

TABLE 8

| CHOKE SIZE | Cv LIMIT |
|---|---|
| 4/32 | .39 |
| 5/32 | .60 |
| 6/32 | .85 |
| 7/32 | 1.12 |
| 8/32 | 1.65 |
| 9/32 | 2.10 |
| 10/32 | 2.52 |
| 11/32 | 2.85 |
| 12/32 | 3.20 |

Performance Model Test

To test the accuracy of the correlations employed in the system of the present invention, the flow through a selected valve may be computed using the correlations with data from the live valve tests. The calculation procedure to determine the correlations is as set forth below:

Step 1) Compute static stem travel for particular value of interest $$X_s = A_b * (Ptf - Pvc) / k$$

Step 2) Compute dP/Ps ratio $$dP/P_s = (Pcf - Ptf) / (Ptf - Pvc)$$

Step 3) Compute dynamic stem travel $$x_d = x_s * [N1*(dP/P_s)^3 + N2*(dP/P_s)^2 + N3*(dP/P_s) + N4]$$

Values of coefficients chosen for appropriate choke
Step 4) Compute $C_v$ factor $$C_v = M1*x_d^3 + M2*x_d^2 + M3*x_d + M4$$

Value limited to maximum $C_v$ per choke size
Step 5) Compute actual pressure ratio $$x = (Pcf - Ptf) / (Pcf + 14.7)$$

Step 6) Compute limiting pressure ratio $$X_t = P1*x_d^3 + P2*x_d^2 + P3*x_d + P4$$

Step 7) If actual pressure ratio is greater than limiting pressure ratio then use limiting pressure ratio.

Step 8) Compute flow rate through valve $$MSCFD = 36.67 * C_v * Pc * SQR(x/(R * Sg))$$

It should be noted here that, as was stated above, there are various known relationships for determining the flow coefficient of a valve. If a relationship other than the ISA standard was previously used to calculate a flow coefficient for different fixed stem positions of the valve, then that same relationship must be used in the method and system of the present invention to calculate the flow rate through the valve.

Figure 9:
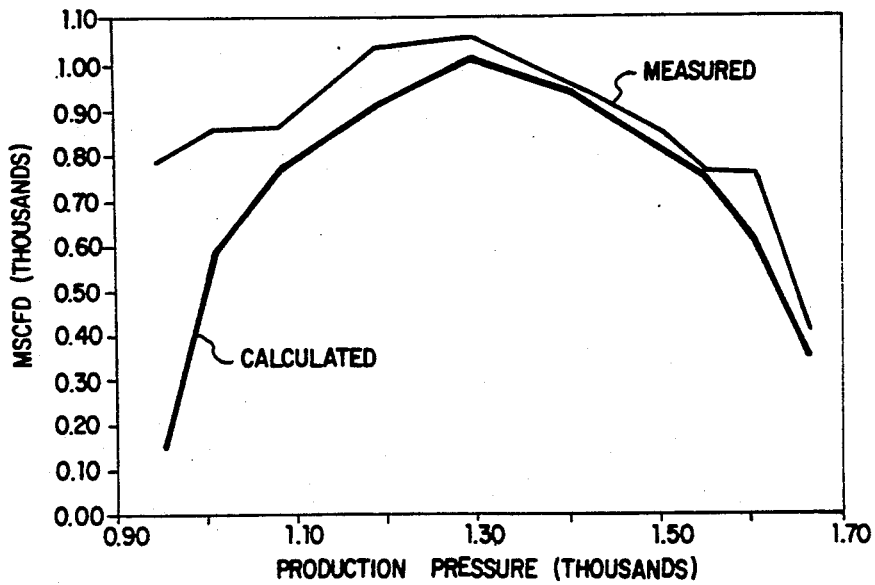
FIG. 9 is a graph comparing measured flow rate for a valve as compared to flow rate for the same valve calculated in accordance with the system of the present invention.

A table of calculated data is set forth below in Table 9 while a plot of the actual measured data along with the corresponding calculated data is shown in FIG. 9.

TABLE 9

| DATA FILE C: CVDATA | | | CORRELATION COEFFICIENTS | | | |
|---|---|---|---|---|---|---|
| TEST NUMBER: 89063009 | | | N1 | N2 | N3 | N4 |
| VALVE TYPE: 222RF1500 | $C_v$ | | 2684.8 | −606.46 | 44.95 | 0.0051 |
| CHOKE: (3) 1.8 DIA | $X_t$ | | −687.68 | 140.66 | −8.959 | 0.965 |
| CLOSE PRESSURE: 940 | $X_d$ | | 1.7994 | −0.893 | −1.0273 | 0.9702 |
| BELLOWS: 0.23 | TRAVEL LIMIT | | | 0.12 | MODIFIER | 1.15 |
| SPRING: 608 | Cv LIMIT | | | 1.12 | STD DEV | 184 |
| P1 | P2 | TEMP | T MSCFD | CV MSCFD | ERROR | % | TRAVEL |
| 1696 | 1665 | 77.3 | 420 | 360 | −60 | −14.3 | 0.162 |
| 1697 | 1607 | 77.4 | 762 | 614 | −148 | −19.5 | 0.135 |
| 1686 | 1551 | 77.4 | 762 | 749 | −13 | −1.7 | 0.113 |
| 1664 | 1496 | 77.4 | 856 | 821 | −35 | −4.1 | 0.096 |
| 1630 | 1404 | 77.4 | 959 | 937 | −22 | −2.3 | 0.070 |
| 1596 | 1296 | 77.4 | 1056 | 1008 | −48 | −4.5 | 0.044 |
| 1572 | 1190 | 77.5 | 1032 | 970 | −125 | −12.1 | 0.027 |
| 1570 | 1083 | 77.5 | 859 | 765 | −94 | −11.0 | 0.018 |
| 1570 | 1012 | 77.5 | 859 | 582 | −277 | −32.2 | 0.011 |
| 1571 | 950 | 77.5 | 786 | 134 | −652 | −82.9 | 0.002 |
| 0 | 0 | 0 | 0 | ERR | ERR | ERR | ERR |
| 0 | 0 | 0 | 0 | ERR | ERR | ERR | ERR |

Referring to Table 9, the right four columns consist of values computed in accordance with the correlation. In the majority of cases, the percent difference between actual and computed flow rates is within 10%, a significant increase in accuracy over prior techniques. Significant deviations between actual and computed values occur at pressures approaching the Pvc of the valve.

It should be noted from FIG. 9 that the shape of the computed curve closely follows that of the actual curve but it is shifted either slightly above or below the actual curve. The curve can be shifted in either direction without changing its shape if a scalar quantity is multiplied into the dYnamic stem travel factor. The shifts in the curve seems to indicate that the ratio of Pvc/Pcf has some influence over the value.

For example, if a typical test is selected for use as a reference, and a computation of the ratio Pvc/Pcf is computed and then multiplied by a factor to obtain the value one, and this factor then used as the modifier for all the other tests with the same size choke, it correctly shifts the performance curves into still closer correlation with the theoretical values. A series of values showing the correlation modifiers for various sizes of chokes is shown in Table 10.

TABLE 10

| CORRELATION MODIFIER | |
|---|---|
| Choke Size | Modifier |
| 4/32 | 1.150 |
| 5/32 | 1.150 |

TABLE 10-continued

CORRELATION MODIFIER

| Choke Size | Modifier |
|---|---|
| 6/32 | 1.150 |
| 7/32 | 1.150 |
| 8/32 | 1.150 |
| 9/32 | 1.150 |
| 10/32 | 1.150 |
| 11/32 | 1.150 |
| 12/32 | 1.150 |

In summary, the technique of the present invention enables the use of a simplified test technique to obtain reliable data for pressure controlled valve flow performance predictions. The method involves two sets of tests, a flow coefficient test and a live valve test. Each of the flow coeffioient tests are preferably conducted in accordance with ISA standards. A comparison between the flow coefficients calculated at low test pressures and those calculated at high test pressures indicate that low test pressures can be used with good reliability to predict performance of a valve at higher pressures. This produces a method such that the flow coefficient tests can be conducted without the need of expensive high pressure compressor systems. In fact, with suitable test equipment, such tests can be run on systems with as little as 100 psig source pressure.

It should be noted that flow coefficient testing alone will not suffice to accurately predict the performance range of a pressure controlled valve, such as a gas lift valve. The position of the valve stem with respect to the port has a very large influence over the performance of the valve, and a second set of tests with live valves need to be conducted in order to predict the dynamic stem position during flowing conditions. The system of the present invention includes a stem travel correlation technique which when tested against live valve test data is shown to be accurate within about 10% of the actual data. The development of this correlation requires live valve tests at pressures close to those anticipated during actual service and development of correlations for other valves will also require live valve tests. Such tests need to be conducted with source pressures as high as 2000 psig. The correlation, however:' indicates that future live valve tests can be conducted at much lower pressures with equal accuracy.

COMPARISON OF PRESENT METHOD WITH THORNHILL-CRAVER

In the system of the present invention, standard spread sheet programs, such as Lotus 1-2-3 can be used to perform the necessary calculations. For example, when that program is used to perform the calculations for flow performance through a selected valve, it requires the user to input choke size, flowing casing pressure, temperature, specific gravity and set pressure of the valve. When any one of these variables is changed, the program will then recalculate the flow performance of the valve at 25 psi tubing pressure increments starting with the flowing casing pressure and ending with the valve Pvc. In addition the same program will calculate the flow rate using the Thornhill-Craver equation for the same conditions. A sample set of calculations is shown in Table 11 and a comparison of the two in shown in the graph of FIG. 11.

TABLE 11

222RF1500 FLOW CALCULATION

| CHOKE: | 4 | Pcf: | 1800 | Pvc: | 1500 | k: | 1.27 |
|---|---|---|---|---|---|---|---|
| | | TEMP: | 130 | Sg: | 0.65 | Cd: | 0.865 |
| | | | | | | z: | 0.821 |

| Ptf | PRESSURE RATIO | DYNAMIC TRAVEL | FLOW COEFF | CALCULATED MSCFD | THORNHILL CARVER MSCFD |
|---|---|---|---|---|---|
| 1775 | 0.014 | 0.097 | 0.390 | 137.3 | 157.2 |
| 1750 | 0.028 | 0.077 | 0.390 | 194.2 | 220.5 |
| 1725 | 0.041 | 0.059 | 0.390 | 237.9 | 267.8 |
| 1700 | 0.055 | 0.043 | 0.390 | 274.7 | 306.5 |
| 1675 | 0.069 | 0.030 | 0.388 | 304.5 | 339.7 |
| 1650 | 0.083 | 0.020 | 0.387 | 333.8 | 368.8 |
| 1625 | 0.096 | 0.014 | 0.346 | 322.7 | 394.8 |
| 1600 | 0.110 | 0.010 | 0.295 | 294.2 | 418.1 |
| 1575 | 0.124 | 0.009 | 0.263 | 277.6 | 439.4 |
| 1550 | 0.138 | 0.007 | 0.239 | 266.6 | 458.7 |
| 1525 | 0.152 | 0.005 | 0.184 | 214.4 | 476.5 |
| 1500 | 0.165 | 0.000 | −0.012 | −15.1 | 492.8 |
| 0 | 0.992 | −0.575 | ****** | ****** | 0.0 |
| 0 | 0.992 | −0.575 | ****** | ****** | 0.0 |
| 0 | 0.992 | −0.575 | ****** | ****** | 0.0 |
| 0 | 0.992 | −0.575 | ****** | ****** | 0.0 |
| 0 | 0.992 | −0.575 | ****** | ****** | 0.0 |
| 0 | 0.992 | −0.575 | ****** | ****** | 0.0 |
| 0 | 0.992 | −0.575 | ****** | ****** | 0.0 |
| 0 | 0.992 | −0.575 | ****** | ****** | 0.0 |
| 0 | 0.992 | −0.575 | ****** | ****** | 0.0 |
| 0 | 0.992 | −0.575 | ****** | ****** | 0.0 |
| 0 | 0.992 | −0.575 | ****** | ****** | 0.0 |
| 0 | 0.992 | −0.575 | ****** | ****** | 0.0 |
| 0 | 0.992 | −0.575 | ****** | ****** | 0.0 |

| 35FLOW COEFF | RATIO COEFF | TRAVEL COEFF | SPRING: | 608.00 |
|---|---|---|---|---|
| 19427.00 | −24128.0 | 3.342 | $C_v$ LIMIT: | 0.39 |
| −1630.00 | 1723.00 | −2.672 | $X_d$ LIMIT: | 0.12 |
| 44.76 | −34.48 | −0.868 | MODIFYER: | 1.150 |
| −0.01 | 1.02 | 1.058 | | |

Figure 11:
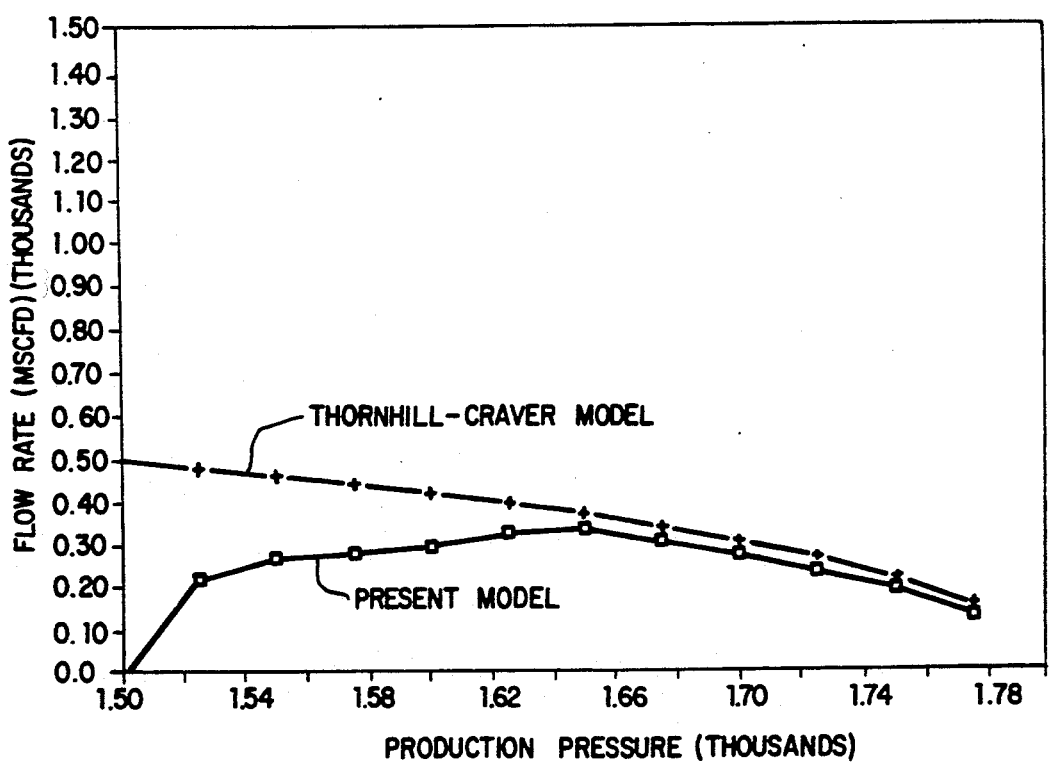
FIG. 11 is a graph comparing the flow rates calculated with prior art assumptions to flow rates calculated in accordance with the system of the present invention.

Referring to Table 11 and FIG. 11, for small choke sizes, the difference between the model employed in the system of the present invention and the Thornhill- Craver equation calculations is small. However, as mentioned previously Thornhill-Craver predicts maximum flow at the valve closing pressures while the system of the present invention accurately accounts for throttling effects. In summary, Thornhill-Craver will always overpredict gas flow rates at pressures close to Pvc. As the choke sizes increase, the difference between Thornhill-Craver and the results of the present invention become very large with Thornhill-Craver overpredicting flow rates by as much as 300%. It is quite evident the use of the Thornhill-Craver equation is not appropriate for gas passage predictions through throttling gas lift valves. This is not only true for fluid-operated valves but also true for pressure-operated valves with nitrogen charges. The Thornhill-Craver equation is set forth below

THORNHILL-CRAVER EQUATION $$MSCFD = \frac{155.5 * A_p * C_d * P_{cf} * SQR(2*g*k/(k+1)*(X^{(2/k)} - X^{((k+1)/k)}))}{SQR(S_{gg}*(R-460)*Z)}$$

Where ...
$A_p$ = Area of port (sq in)
$C_d$ = Discharge coefficient (.865)
$P_{cf}$ = Flowing casing pressure
$g$ = Gravitational constant (32.2 ft/sec 2)
$k$ = Ratio of specific heats (Air = 1.4)
$X$ = Pressure ratio ($P_{tf}/P_{cf}$)
$S_{gg}$ = Specific gravity
$R$ = Flowing temperature (Degrees Rankine)
$Z$ = Compressability factor It is believed that the operation and structure of the present invention and practice thereof will be apparent from the foregoing description. While the method and apparatus shown and described has been characterized as being preferred, obvious changes and modifications may be made therein without departing from the spirit and scope of the invention as defined in the following claims.

What is claimed is:

1. A method for determining the flow performance of a pressure responsive valve, comprising:
   (1) measuring the flow rate of the valve at a plurality of different values of pressure drop across the valve and at different fixed stem positions of the valve;
   (2) determining from the values measured in step (1) the flow coefficient of the valve at each stem position thereof;
   (3) determining from the values measured in step (1) the terminal pressure drop ratio of the valve at each stem position thereof;
   (4) empirically determining a mathematical relationship describing the flow coefficient of the valve as a function of the stem position thereof;
   (5) empirically determining a mathematical relationship describing the terminal pressure drop ratio of the valve as a function of the stem position thereof;
   (6) measuring for a plurality of different closing pressures of the valve, the flow rate of the valve at various values of casing pressure with various values of pressure drop across the valve for each;
   (7) using the values employed and measured in step (6) to determine a value of flow coefficient at each measured data point;
   (8) using each value of flow coefficient determined in step (7) and the mathematical relationship determined in step (4) to determine a value of dynamic stem position for the valve at each measured data point;
   (9) determining the station stem position for each value employed and measured in step (6) and for the fixed values of effective bellows area and spring rate for the valve;
   (10) empirically determining a mathematical relationship describing the dynamic stem travel of the valve as a function of the ratio of the differential pressure across the valve to the difference between the casing pressure and the valve closing pressure;
   (11) determining the dynamic stem position for each value employed and measured in step (6) with each value of static stem position calculated in step (10).
   (12) using the dynamic stem position calculated in step (11) in the mathematical relationship determined in step (4) to calculate a value of flow coefficient for each dynamic stem position; and
   (13) using the value of flow coefficient calculated in step (12) to calculate a fluid flow rate through the valve for the corresponding differential pressure across the valve, casing pressure and valve closing pressure used in step (10).

2. A method for determining the flow performance of a pressure responsive valve as set forth in claim 1 in which the mathematical relationship determined in step (10) describes the ratio of dynamic stem travel to station stem travel of the valve as a function of the ratio of the differential pressure across the valve to the difference between the casing pressure and the closing pressure of the valve.

3. A method for determining the flow performance of a pressure operated valve as set forth in claim 2 in which:
   the flow coefficient values determined in step 2 and the flow rates calculated in step 13 are determined in accordance with the ISA standard relationships.

4. A method for determining the flow performance of a pressure responsive valve as set forth in claim 1 in which the flow coefficient is determining in step (2) from the values measured in step (1) in accordance with the following relationship:

$$C_v = q/(N7*P1) * SQR(T1*Gg/x),$$

where:

q = Flow rate in standard ft²/hr (SCFH);
N7 = A constant;
P1 = Upstream pressure (PSIA);
T1 = Fluid temperature in degrees Rankine;
Gg = Specific gravity of fluid;
x = Pressure drop ratio (dP/P1); and
dP = Upstream - Downstream pressure (PSIA).

5. A method of determining the flow performance of a pressure responsive valve as set forth in claim 1 in which the static stem position of the valve is determined by performing calculations in accordance with the static force balance equations and constants for the particular valve, the flow performance of which is being evaluated.

6. A method for determining the flow performance of a pressure responsive valve as set forth in claim 1 in which the station stem position of the valve is determined by performing calculations in accordance with the following relationship:

$$X_s = A_b * (P_{tf} - P_{vc}) / k$$

where:

$A_b$ = Effective bellows area of valve (in$^2$);
$P_{tf}$ = Downstream pressure on valve (psig);
Pvc = Downstream set pressure of valve (psig); and
k = Spring rate of valve (lbf/in).

7. A method for determining the flow performance of a pressure responsive valve as set forth in claim 1 which also includes determining the flow rate of fluid through said valve by the steps of:
   selecting from the results of step (11) a dynamic stem position associated with the particular pressure conditions at which said valve is to be operated;
   determining the flow coefficient of the valve associated with the particular dynamic stem position; and
   determining a flow rate for said valve at the determined flow coefficient and the particular pressure conditions at which said valve is to be operated.

8. A method for determining the flow performance of a pressure responsive valve as set forth in claim 1 in which the valve is a gas lift valve and in which step (1) of measuring the flow rate of the valve includes:
   modifying the valve by removing the bellows thereof and replacing the pressure actuated valve stem with a valve stem which can be manually adjusted in increments from fully closed to fully open; and
   incrementally adjusting the position of the valve stem between each set of measurement values taken to obtain a sequence of flow rate values at various values of separation of the valve stem from the valve seat between full closed and full open.

9. A method for determining the flow performance of a pressure responsive valve having a selected closing set pressure, at which the valve just opens for a given upstream pressure and set pressure, when said valve is subjected to a particular upstream pressure and a particular downstream pressure, said method comprising the steps of:
   (1) determining the static stem position of the valve;
   (2) empirically determining a mathematical relationship describing the flow coefficient of the valve as a function of the static stem position of the valve;
   (3) empirically determining a mathematical relationship describing the ratio of the dynamic stem position to the station stem position of the valve as a function of the ratio of the differential pressure across the valve to the difference between the upstream pressure on the valve and the closing pressure of the valve; and
   (4) determining with the relationship determined in step (3) the dynamic stem position of the valve at the static stem position calculated in step (1) and for said particular upstream pressure and said particular downstream pressure;
   (5) determining with the relationship determined in step (2) the flow coefficient of the valve from the dynamic stem position of the valve calculated in step (4); and
   (6) determining the flow rate through the valve from the flow coefficient calculated in step (5) and said particular upstream and downstream pressures.

10. A method for determining the flow performance of a pressure responsive valve having a selected closing pressure as set forth in claim 9 in which the step of empirically determining a mathematical relationship describing the flow coefficient of the valve as a function of the dynamic stem position of the valve includes determining a relationship of the following form:

$$Cv = M1 * x_d^3 + M2 * x_d^2 + M3 * x_d + M4,$$

where:

M1, M2, M3, M4 = coefficients for curve fit; and
$x_d$ = dynamic stem travel.

11. A method for determining the flow performance of a pressure responsive valve having a selected closing pressure as set forth in claim 9 in which the step of empirically determining a mathematical relationship describing the ratio of the dynamic stem position to the static stem position of the valve as a function of the ratio of the differential pressure across the valve to the difference between the upstream pressure on the valve and the closing pressure of the valve includes determining a relationship of the following form:

$$X_d/X_s = N1(dP/P_s)^3 + N2(dP/P_s)^2 + N3(dP/P_s) + N4,$$

where:

$X_d$ = Dynamic stem position of valve;
$X_s$ = Static stem position of valve;
N1,N2,N3,N4 = coefficients for curve fit;
dP = Differential pressure across the valve; and
$P_s$ = Difference between the upstream pressure on the valve and the closing pressure of the valve.

12. A method for determining the flow performance of a pressure responsive valve having a selected closing pressure and as set forth in claim 9 in which the step of calculating the static stem position of the valve at said particular closing pressure includes calculating said position in accordance with the force balance equations and constants for the particular valve, the flow performance of which is being evaluate.

13. A method for determining the flow performance of a pressure responsive valve having a selected closing pressure and as set forth in claim 9 in which the step of calculating the static stem position of the valve at said particular downstream pressure includes calculating said position with the following relationship:

$$X_s = A_b * (P_{tf} - P_{vc}) / k$$

where:
$A_b$ = Effective bellows area of valve (in$^2$);
$P_{tf}$ = Downstream pressure on valve (psig);
Pvc = Downstream set pressure of valve (psig); and
k = Spring rate of valve (lbf/in).

14. A method for determining the flow performance of a pressure responsive valve having a selected closing pressure and as set forth in claim 10 in which step (5) of determining the flow coefficient includes calculating said flow coefficient from measured values of flow rate at particular values of upstream and downstream pressures with the following relationship:

$$MSCFD = 36.68 * C_v * P_{cf} * SQR(R * S_g)$$

where:

36.68 = Conversion factor from SOFH to MSCFD;
Cv = Flow coefficient;
$P_{cf}$ = Upstream pressure;
R = temperature in degrees Rankine;
$S_g$ = specific gravity of fluid; and
x32 Upstream pressure - Downstream pressure/Upstream Pressure + 14.7.

15. A method for determining the flow performance of a pressure responsive valve having a selected closing pressure by calculating the flow coefficient of the valve from the flow rate through the valve with the relationship set forth in claim 14 further includes determining the dynamic stem position of the valve at various pressure conditions by:
   tentatively and iteratively assigning a value of dynamic stem position and then calculating a value of flow rate with the relationship set forth in claim 14;
   comparing each value of flow rate calculated with the value of flow rate measured for the same flow conditions;
   terminating said assigning steps when said measured and calculated flow rates are substantially the same;
   selecting the dynamic stem position which produced a calculated value of flow rate which was substantially the same as said measured rate; and
   determining the value of flow coefficient associated with the selected value of dynamic stem position at each pressure condition.

16. A method for enabling the determination of the flow performance of a pressure responsive valve, comprising:
   (1) measuring the flow rate of the valve at a plurality of different fixed stem positions of the valve;
   (2) calculating from the values measured in step (1) the flow coefficient of the valve at each stem position thereof in accordance with a known relationship for determining flow coefficient;
   (3) measuring the flow rate of the valve under a plurality of different pressure conditions on the valve;
   (4) calculating from the values measured in step (3) and the known relationship employed in step (2) the flow coefficient at each of the different pressure conditions;
   (5) determining for each flow coefficient calculated in step (4) and values calculated in step (2) the corresponding actual stem position of the valve at each pressure condition; and
   (6) determining a relationship between the actual stem position of the valve and known parameters and operating conditions of the valve.

17. A method for enabling the determination of the flow performance of a pressure responsive valve as set forth in claim 16 in which the known relationship for determining flow coefficient employed in steps (2) and (4) is the ISA standard relationship.

18. A method for enabling the determination of the flow performance of a pressure responsive valve as set forth in claim 16 in which the known relationship for determining flow coefficient employed in steps (2) and (4) is of the following form:

$$Cv = q / (N7 \cdot P1) \cdot SQR(T1 \cdot Gg/x),$$
where:

q = Flow rate in standard ft²/hr (SCFH);
N7 = A constant;
P1 = Upstream pressure (PSIA);
T1 = Fluid temperature in degrees Rankine;
Gg = Specific gravity of fluid;
x = Pressure drop ratio (dP/P1); and
dP = Upstream Downstream pressure (PSIA).

19. A method for enabling the determination of the flow performance of a pressure responsive valve as set forth in claim 16 in which the relationship determined in step (6) is describes the ratio of actual stem travel of the valve to static stem travel of the valve as a function of the ratio of the differential pressure across the valve to the difference between the casing pressure and the closing pressure of the valve.

20. A method for enabling the determination of the flow performance of a pressure responsive valve as set forth in claim 16 in which the relationship determined in step (6) is of the following form:

$$X_d = f(dP/P_s),$$
where:

$X_d$ = Actual stem position of valve;
dP = Differential pressure across the valve; and
$P_s$ = Difference between the upstream pressure on the valve and the closing pressure of the valve.

21. A method for enabling the determination of the flow performance of a pressure responsive valve as set forth in claim 16 in which the relationship determined in step (6) is of the following form:

$$X_d/X_s = N1(dP/P_s)^3 + N2(dP/P_s)^2 + N3(dP/P_s) + N4,$$
where:

$X_d$ = Actual stem position of valve;
$X_s$ = Static stem position of valve;
N1,N2,N3,N4 = coefficients for curve fit;
dP = Differential pressure across the valve; and
$P_s$ = Difference between the upstream pressure on the valve and the closing pressure of the valve.

22. A method for determining the flow performance of a pressure responsive valve, comprising:
   (1) measuring the flow rate of the valve at a plurality of different fixed stem positions of the valve;
   (2) determining from the values measured in step (1) the flow coefficient of the valve at each stem position thereof in accordance with a known relationship for determining flow coefficient;
   (3) determining from the values measured in step (1) the terminal pressure drop ratio of the valve at each stem position thereof;
   (4) empirically determining a mathematical relationship describing the flow coefficient of the valve as a function of the stem position thereof;
   (5) empirically determining a mathematical relationship describing the terminal pressure drop ratio of the valve as a function of the stem position thereof;
   (6) measuring, for a plurality of different closing pressures of the valve, the flow rate of the valve at various values of casing pressure with various values of pressure drop across the valve for each;
   (7) using the values employed and measured in step (6) to determine a value of flow coefficient at each measured data point;
   (8) using each value of flow coefficient determined in step (7) and the mathematical relationship derived in step (4) to determine a value of dynamic stem position for the valve at each measured data point;

(9) determining the static stem position for each value employed and measured in step (6) and for the fixed values of effective bellows area and spring rate for the valve;

(10) empirically determining a mathematical relationship describing the dynamic stem travel of the valve as a function of the ratio of the differential pressure across the valve to the difference between the casing pressure and the valve set pressure;

(11) determining the dynamic stem position for each value employed and measured in step (6) with each value of station stem position calculated in step (10);

(12) using the dynamic stem position in the mathematical relationship determined in step (4) to calculate a value of flow coefficient for each dynamic stem position; and

(13) using the value of flow coefficient calculated in step (12) to calculate, in accordance with the known relationship used in step (2), a fluid flow rate through the valve for the corresponding differential pressure across the valve, casing pressure and valve closing pressure used in step (10).

23. A method for determining the flow performance of a pressure responsive valve as set forth in claim 22, in which the known relationship for determining flow coefficient employed in steps (2) and (12) is the ISA standard relationship.

24. A method for determining the flow performance of a pressure responsive valve as set forth in claim 22 in which the known relationships for determining flow coefficient and flow rate employed in steps (2) and (12) are of the following form:

$$Cv = q/(N7*P1) * SQR(T1*Gg/x),$$

where:

q = Flow rate in standard ft$^2$/hr (SCFH);
N7 = A constant;
P1 = Upstream Pressure (PSIA);
T1 = Fluid temperature in degrees Rankine;
Gg = Specific gravity of fluid;
x = Pressure drop ratio (dP/P1); and
dP = Upstream—Downstream pressure (PSIA).

25. A method for determining the flow performance of a pressure responsive valve having a selected closing pressure, at which the valve just opens for a given upstream pressure and set pressure, at a particular upstream pressure when said valve is subjected to particular values of downstream pressure between the value of said upstream pressure and said closing pressure, said method comprising the steps of:

storing in a memory a mathematical relationship describing the flow coefficient of the valve as a function of the dynamic stem position of the valve;

storing in a memory a mathematical relationship describing the ratio of the dynamic stem position to the static stem position of the valve as a function of the ratio of the differential pressure across the valve to the difference between the upstream pressure on the valve and the closing pressure of the valve;

storing in a memory calculated values of station stem positions of said valve for said particular values of downstream pressure;

determining from said particular values of downstream pressure a sequence of parameters yielding dynamic stem position flow coefficient and flow rate through the valve at each downstream pressure.

26. A method for determining the flow performance of a pressure responsive valve having a selected closing pressure, at which the valve just opens for a given upstream pressure and set pressure, at a particular upstream pressure when said valve is subjected to particular values of downstream pressure between the value of said upstream pressure and said closing pressure, as set forth in claim 25 in which the mathematical relationship describing the flow coefficient of the valve as a function of the dynamic stem position of the valve stored is of the following form:

$$Cv = M1*x_d^3 = M2*x_d^2 + M3*x_d + M4,$$

where:

M1, M2, M3, M4 = coefficients for curve fit; and
$x_d$ = dynamic stem travel.

27. A method of determining the flow performance of a pressure responsive valve having a selected closing pressure, at which the valve just opens for a given upstream pressure and set pressure, at a particular upstream pressure when said valve is subjected to particular valves of downstream pressure between the upstream pressure and said closing pressure, as set forth in claim 25 in which the mathematical relationship is of the following form:

$$Xd = f(dP/Ps),$$

Where:

Xd = Dynamic stem position of value;
dP = differential pressure across the valve; and
Ps = difference between the upstream pressure on the valve and the closing pressure on the valve.

28. A method for determining the flow performance of a pressure responsive valve having a selected closing pressure, at which the valve just opens for a given upstream pressure and set pressure, at a particular upstream pressure when said valve is subjected to particular values of downstream pressure between the value of said upstream pressure and said closing pressure, as set forth in claim 25 in which the mathematical relationship describing the ratio of the dynamic stem position of the valve to the static stem position of the valve stored is of the following form:

$$X_d/X_s = N1(dP/P_s)^3 + N2(dP/P_s)^2 + N3(dP/P_s) + N4,$$

where:

$X_d$ = Dynamic stem position of value;
$X_s$ = Static stem position of valve;
N1, N2, N3, N4 = coefficients for curve fit;
dP = Differential pressure across the valve; and
$P_s$ = Difference between the upstream pressure on the valve and the closing pressure of the valve.

29. A method of determining the flow performance of a pressure responsive valve having a selected closing pressure, at which the valve just opens for a given upstream pressure and set pressure, at a particular upstream pressure when said valve is subjected to particular values of downstream pressure between the value of said upstream pressure and said closing pressure, as set forth in claim 25 in which the values of static stem position stored in memory are calculated in accordance with the station force balance equations and constants for the particular valve, the flow performance of which is being evaluated.

30. A method for determining the flow performance of a pressure responsive valve having a selected closing pressure, at which the valve just opens for a given upstream pressure and set pressure, at a particular upstream pressure when said valve is subjected to particular values of downstream pressure between the value of said upstream pressure and said closing pressure, as set forth in claim 21 in which the values of static stem position stored in memory are calculated in accordance with the following relationship:

$$X_s = A_b * (P_{tf} - P_{vc}) / k$$

where:

$A_b$ = Effective bellows area of valve (in$^2$);
$P_{tf}$ = Downstream pressure on valve (psig);
Pvc = Downstream set Pressure of valve (psig); and
k = Spring rate of valve (lbf/in).

31. A method for determining the location of gas lift valves within a gas lift completion comprising;
    determining the flow performance of a gas lift valve to be used in the completion in accordance with the following procedures:
    (1) measure the flow rate of the valve at a plurality of different fixed stem positions of the valve;
    (2) determine from the values measured in step (1) the flow coefficient of the valve at each stem position thereof in accordance with a known relationship for determining flow coefficient;
    (3) determine from the values measured in step (1) the terminal pressure drop ratio of the valve at each stem position thereof;
    (4) empirically determine a mathematical relationship describing the flow coefficient of the valve as a function of the stem position thereof;
    (5) empirically determine a mathematical relationship describing the terminal pressure drop ratio of the valve as a function of the stem position thereof;
    (6) measure, for a plurality of different closing pressures of the valve the flow rate of the valve at various values of casing pressure with various values of pressure drop across the valve for each;
    (7) use the values employed and measured in step (6) to determine a value of flow coefficient at each measured data point;
    (8) use each value of flow coefficient determined in step (7) and the mathematical relationship derived in step (4) to determine a value of dynamic stem position for the valve at each measured data point;
    (9) determine the static stem position for each value employed and measured in step (6) and for the fixed values of effective bellows area and spring rate for the valve;
    (10) emPirically determine a mathematical relationship describing the dynamic stem travel of the valve as a function of the ratio of the differential pressure across the valve to the difference between the casing pressure and the valve set pressure;
    (11) determine the dynamic stem position for each value employed and measured in step (6) with each value of static stem position calculated in step (9)
    (12) use the dynamic stem position in the mathematical relationship determined in step (4) to calculate a value of flow coefficient for each dynamic stem position; and
    (13) use the value of flow coefficient calculated in step (12) to calculate, in accordance with the known relationship used in step (2), a fluid flow rate through the valve for the corresponding differential pressure across the valve, casing pressure and valve closing pressure used in step (10);
    determining the flow produced at each precised valve location in the completion; and
    determining the actual location of each valve in the completion.

32. A method for determining the location of gas lift valves within a gas lift completion as set forth in claim 31 in which the procedures, in accordance with which the flow performance of the gas lift valve to be used in the completion was determined, includes using the ISA standard relationship in steps (2) and (12) for determining flow coefficient and flow rate.

33. A method for determining the location of gas lift valves within a gas lift completion as set forth in claim 31 in which the procedures, in accordance with which the flow performance of the gas lift valve to be used in the completion was determined, includes using the following relationship in steps (2) and (12) for determining flow coefficient and flow rate:

$$Cv = q / (N7 * P1) * SQR(T1 * Gg/x),$$

where:
q = Flow rate in standard ft2/hr (SCFH);
N7 = A constant;
P1 = Upstream pressure (PSIA);
T1 = Fluid temperature in degrees Rankine;
Gg = Specific gravity of fluid;
x = Pressure drop ratio (dP/P1); and
dP = Upstream - Downstream pressure (PSIA).

34. A method for determining the location of gas lift valves within a gas lift completion as set forth in claim 31 in which the procedures, in accordance with which the flow performance of the gas lift valve to be used in the completion was determined, includes determining a relationship for the following form in step (10):

$$X_d/X_s = N1(dP/P_s)^3 + N2(dP/P_s)^2 + N3(dP/P_s) + N4,$$

where:

$X_d$ = Actual stem position of valve;
$X_s$ = Static stem position of valve;
N1, N2, N3, N4 = coefficients for curve fit;
dP = Differential pressure across the valve; and
$P_s$ = Difference between the upstream pressure on the valve and the closing pressure of the valve.

* * * * *